(12) United States Patent
Gill et al.

(10) Patent No.: US 8,725,656 B1
(45) Date of Patent: May 13, 2014

(54) FREIGHT RATE MANAGER

(75) Inventors: James M. Gill, San Jose, CA (US);
Antony A. Awaida, Palo Alto, CA (US);
Ian J. H. Williams, San Jose, CA (US)

(73) Assignee: United Parcel Service of America, Inc., Atlanta, GA (US)

( * ) Notice: Subject to any disclaimer, the term of this patent is extended or adjusted under 35 U.S.C. 154(b) by 2266 days.

(21) Appl. No.: 09/939,206

(22) Filed: Aug. 24, 2001

Related U.S. Application Data

(63) Continuation-in-part of application No. 09/573,583, filed on May 18, 2000, now abandoned.

(51) Int. Cl.
*G06Q 10/00* (2012.01)

(52) U.S. Cl.
USPC .......................................... 705/335; 705/331

(58) Field of Classification Search
USPC ............................................................. 705/1
See application file for complete search history.

(56) References Cited

U.S. PATENT DOCUMENTS

| | | | |
|---|---|---|---|
| 4,949,272 A | 8/1990 | Vanourek et al. | |
| 5,063,506 A | 11/1991 | Brockwell et al. | |
| 5,117,364 A * | 5/1992 | Barns-Slavin et al. | 705/402 |
| 5,337,246 A | 8/1994 | Carroll et al. | |
| 5,375,241 A | 12/1994 | Walsh | |
| 5,448,641 A * | 9/1995 | Pintsov et al. | 380/51 |
| 5,485,369 A * | 1/1996 | Nicholls et al. | 705/9 |
| 5,557,518 A | 9/1996 | Rosen | 364/408 |
| 5,631,827 A * | 5/1997 | Nicholls et al. | 705/28 |
| 5,661,653 A * | 8/1997 | Kulik | 705/410 |
| 5,694,590 A | 12/1997 | Thuraisingham et al. | |
| 5,715,398 A * | 2/1998 | Lubenow et al. | 705/7 |
| 5,721,832 A | 2/1998 | Westrope et al. | |
| 5,745,886 A | 4/1998 | Rosen | 705/39 |
| 5,758,328 A | 5/1998 | Giovannoli | 705/26 |
| 5,774,553 A | 6/1998 | Rosen | 380/49 |

(Continued)

FOREIGN PATENT DOCUMENTS

| | | |
|---|---|---|
| GB | 2331001 A | 5/1999 |
| GB | 2331384 A | 5/1999 |

(Continued)

OTHER PUBLICATIONS

Hickey, Kathleen, Vendors discuss how their technology can help you, Sep. 22, 2003, Traffic World, p. L12. Dialog reference 0006293840.*

(Continued)

*Primary Examiner* — Gabrielle McCormick
(74) *Attorney, Agent, or Firm* — Alston & Bird LLP

(57) ABSTRACT

A freight rate manager provides rules for calculating freight rates for use in delivering real-time costing information. The freight rate manager includes a rate sheet input module for accepting data describing a rate sheet. A rate sheet analyzer analyzes the rate sheet to identify potential errors and compares the rate sheet against rate sheet templates. If a template matches the rate sheet, then the rate sheet analyzer interprets the rate sheet according to the template. If the rate sheet analyzer does not find a matching template, a communications module sends the rate sheet to another location or otherwise stores the rate sheet for analysis. An accessorial charges module accepts information about accessorial charges. The outputs of the rate sheet analyzer and the accessorial charges module are provided to a rule generator which generates rules for calculating freight rates given the rates in the rate sheet and the accessorial charges.

37 Claims, 13 Drawing Sheets

(56) References Cited

U.S. PATENT DOCUMENTS

| | | | |
|---|---|---|---|
| 5,787,402 A | 7/1998 | Potter et al. | 705/37 |
| 5,799,151 A | 8/1998 | Hoffer | |
| 5,878,139 A | 3/1999 | Rosen | 380/24 |
| 5,878,400 A | 3/1999 | Carter, III | |
| 5,897,621 A | 4/1999 | Boesch et al. | 705/26 |
| 5,919,247 A | 7/1999 | Van Hoff et al. | |
| 6,012,065 A | 1/2000 | Boucher et al. | |
| 6,018,725 A * | 1/2000 | Boucher et al. | 705/401 |
| 6,035,289 A * | 3/2000 | Chou et al. | 705/37 |
| 6,049,671 A | 4/2000 | Slivka et al. | |
| 6,061,667 A * | 5/2000 | Danford-Klein et al. | 705/400 |
| 6,065,673 A | 5/2000 | Kokkila | |
| 6,078,889 A | 6/2000 | Boucher et al. | |
| 6,169,977 B1 * | 1/2001 | Hasbani et al. | 705/402 |
| 6,272,536 B1 | 8/2001 | Van Hoff et al. | |
| 6,282,525 B1 | 8/2001 | Kubatzki et al. | |
| 6,286,009 B1 * | 9/2001 | Mattioli et al. | 707/102 |
| 6,321,214 B1 * | 11/2001 | Thiel | 705/408 |
| 6,460,020 B1 | 10/2002 | Pool et al. | |
| 6,462,286 B1 * | 10/2002 | Schwartz et al. | 177/25.15 |
| 6,466,948 B1 * | 10/2002 | Levitsky et al. | 707/104.1 |
| 6,493,871 B1 | 12/2002 | McGuire et al. | |
| 6,594,822 B1 | 7/2003 | Schweitz et al. | |
| 6,629,315 B1 | 9/2003 | Naylor | |
| 6,760,908 B2 | 7/2004 | Ren | |
| 6,873,978 B1 | 3/2005 | Boucher et al. | |
| 6,874,002 B1 * | 3/2005 | Peleus et al. | 707/812 |
| 6,895,401 B2 | 5/2005 | Skinner et al. | |
| 6,901,417 B2 | 5/2005 | Anglin et al. | |
| 6,909,890 B2 | 6/2005 | Lyer | |
| 6,925,476 B1 | 8/2005 | Multer et al. | |
| 6,944,855 B2 | 9/2005 | Konas | |
| 6,944,857 B1 | 9/2005 | Glaser et al. | |
| 6,976,163 B1 | 12/2005 | Hind et al. | |
| 7,319,990 B1 | 1/2008 | Henty | |
| 7,676,376 B2 | 3/2010 | Colman | |
| 7,774,284 B2 | 8/2010 | Williams et al. | |
| 7,818,267 B1 | 10/2010 | Bilibin et al. | |
| 2002/0010665 A1 | 1/2002 | Lefebvre et al. | |
| 2002/0046191 A1 | 4/2002 | Joao | |
| 2002/0049622 A1 | 4/2002 | Lettich et al. | |
| 2002/0116273 A1 | 8/2002 | Sundel | |
| 2003/0105704 A1 | 6/2003 | Sundel | |
| 2003/0236735 A1 | 12/2003 | Brennan et al. | |
| 2004/0015392 A1 | 1/2004 | Hammel et al. | |
| 2004/0024739 A1 | 2/2004 | Copperman et al. | |
| 2004/0143605 A1 | 7/2004 | Jupin et al. | |
| 2004/0194056 A1 | 9/2004 | Combs et al. | |
| 2004/0254808 A1 | 12/2004 | Bennett et al. | |
| 2005/0171871 A1 | 8/2005 | Mizushima et al. | |
| 2005/0222853 A1 | 10/2005 | Black et al. | |
| 2006/0095354 A1 | 5/2006 | Hamzy et al. | |
| 2006/0101425 A1 | 5/2006 | Donovan et al. | |
| 2007/0073551 A1 | 3/2007 | Williams et al. | |
| 2007/0198279 A1 | 8/2007 | Hallas et al. | |
| 2007/0299686 A1 | 12/2007 | Hu et al. | |
| 2007/0299732 A1 | 12/2007 | Gluzberg et al. | |
| 2009/0089125 A1 | 4/2009 | Sultan | |

FOREIGN PATENT DOCUMENTS

| | | |
|---|---|---|
| GB | 2331601 A * | 5/1999 |
| GB | 2331602 A | 5/1999 |
| WO | WO 00/29995 | 5/2000 |
| WO | WO 03/030056 | 4/2003 |

OTHER PUBLICATIONS

Dialog Global Reporter, NetSuite announces NetSuite 9.5, Apr. 29, 2004, Dialog reference 35273723.*

Network Computing web pages. "International E-Commerce" pp. 1-2 [online], Nov. 15, 1999 [retrieved on Jun. 6, 2002] Retrieved from the Internet: <URL: http://www.networkcomputing.com/1023/1023f24.html>.

Network Computing web pages. "International E-Commerce Governing Who Goes Global" pp. 1-2 [online], Nov. 15, 1999 [retrieved on Jun. 6, 2002]. Retrieved from the Internet: <URL: http://www.networkcomputing.com/1023/1023f23.html>.

Network Computing web pages. "Shippers Try Software to Tally Foreign Tariffs" pp. 1-3 [online], Dec. 20, 1999 [retrieved on Jun. 6, 2002]. Retrieved from the Internet: <URL: http://www.networkcomputing.com/news/1999/story/0.11280.37919.00.html>.

SupplyChainBrain.com web pages. "The Level of Detail Determines Accuracy in Computing Landed Cost" pp. 1-4 [online], Apr. 2001 [retrieved on Jun. 6, 2002]. Retrieved from the Internet: <http://www.suaplychainbrain.com/archives/4.01.opinion.htm?adcode=30>.

SupplyChainBrain.com web pages. "The Supply Chain e-Business Top 100 Plan: Supply-Chain Planning Builds on Its Success" pp. 1-4 [online], Jun. 2001 [retrieved on Jun. 6, 2002]. Retrieved from the Internet <http://www.glscs.com/archives/6.01.Plann100.htm?adcode=80>.

ManufacturingSystems.com web pages. "International efficiencies, Trade logistics software increases supply chain visibility, aids sourcing across national boundaries," pp. 1-3 [online] [retrieved on Jun. 6, 2002]. Retrieved from the Internet: <http://www.manufacturingsystems.com/newsletter/012802/sb0128.asp>.

Arzoon Life Solutions web pages. "Total Landed Cost Calculator," pp. 1-2 [online] [retrieved on Jun. 6, 2002]. Retrieved from the Internet: <http://www.arzoon.com/als_TotalLandedCostCalculator.html>.

"Supply Chain Network Optimization," Genesis Solutions, 8 pages, <http://www.genesissolutions.com>.

"Logistics Execution for Global Trade," TRADEPAQ Corporation, 2 pages, ™ 1999-2002 by TRADEPAQ Corporation.

Widesoft Systems web pages. "Widesoft B2B Solutions," pp. 1-4 [online] [retrieved on Jun. 6, 2002]. Retrieved from the Internet: <http://www.wideesoft.com/br/site/english>.

WorldWide Retail Exchange web pages. "WorldWide Trade Logistics," 2 pages [online], [retrieved on Jun. 6, 2002] Retrieved from the Internet: <http://worldwideretailexchange.org/cs/en US/exchange/wr36000.html>.

Business Wire, "Fritz Offers Faster Duty and Tax Information to Clients; Takes Orders for New Proprietary Trade Cost Model," 4 pages, Feb. 10, 1999.

ITS America web pages, "Syntra Technologies Launches Global Commerce Management Initiative," pp. 1-4, [online] [retrieved on Jun. 6, 2002] Retrieved from Internet: <http://itsa.org/ITSNEWS.NSF/4e0650bef6193b . . . /cc83903ba39f97852567da00407b7d?OpenDocument>.

NextLinx web pages, "Supplylinks Chooses NetxLinx to Extend Global Transportation Solution," pp. 1-3 [online] [retrieved on Jun. 6, 2002] Retrieved from Internet: <http://nextlinx.com/prs_rel3_20.html>.

Qiva web pages, "Qiva Rolls Out Integrated Product Strategy; Launches New Web Site and Corporate Identity," pp. 1-2 [online] [retrieved Jun. 6, 2002] Retrieved from Internet: <http://www.qiva.com/news/prbrand711.html>.

From2com, Jul. 1999, Forms Strategic Alliance With Subasta.com, PR Newswire.

SupplyChainBrain.com web pages. "The Supply Chain e-Business Top 100 Plan: Supply-Chain Planning Builds on Its Success" pp. 1-4 [online], Jun. 2001 [retrieved on Jun. 6, 2002]. Retrieved from the Internet: <http://www.flsescom/archives/6.01.Plann100.htm?adcode=8Q>.

ManufacturingSystems.com web pages. "International efficiencies, Trade logistics software increases supply chain visibility, aids sourcing across national boundaries," pp. 1-3 [online] [retrieved on Jun. 6, 2002]. Retrieved from the Internet:<http://www.manufacturingsystems.com/newsletter/012802/sb0128.asp>.

Arzoon Life Solutions web pages. "Total Landed Cost Calculator," pp. 1-2 [online] [retrieved on Jun. 6, 2002] Retrieved from the Internet: <http://www.arzoon.com/sfs_TotalLandedCostCalculator.html>.

"Logistics Execution for Global Trade," TRADEPAQ Corporation, 2 pages, © 1999-2002 by TRADEPAQ Corporation.

ITS America web pages, "Syntra Technologies Launches Global Commerce Management Initiative," pp. 1-4, [online] [retrieved on

(56) References Cited

OTHER PUBLICATIONS

Jun. 6, 2002] Retrieved from Internet: <http://itsa.org/ITSNEWS. NSF/4c0650bef6193b . . . /cc83903ba39f97852567da00407b7d?OpenDocument>.

Qiva web pages, "Qiva Rolls Out Integrated Product Strategy; Launches New Web Site and Corporate Identity," pp. 1-2 [online] [retrieved Jun. 6, 2002] Retrieved from Internet <http://www.qiva.com/news/prbrand711.html>.

From2com, Jul. 1999. Forms Strategic Alliance With Subasta.com, PR Newswire.

Xporta, About Xporta, Retrieved Dec. 29, 2000 from Internet Site http://xporta.com/about/index.html, p. 1 f 1.

Xporta, Solutions, Retrieved Dec. 29, 2000 from Internet Site http://xporta.com/solutions/index.html, p. 1 of 1.

Xporta, Xporta Products, Retrieved Dec. 29, 2000 from Internet Site http://xporta.com/solutions/products.html, p. 1 of 1.

Coia, "International Efficiencies: Trade Logistics Software Increases . . . " MSI, Apr. 2002, p. 20, v. 20, No. 4, Tradesphere Importer.

"GE Information Services Launches Cargo*Link EDI Service for Shippers," *Computergram International*, Mar. 2, 1990, Issue No. 0268-716X.

Sweat, "Ship It (WineSmart.com Inc.) (Company Operations)," *Information Week*, Jan. 22, 2001, Issue No. 8750-6874.

Wheatman, "Just Getting Started: Worldwide Traders Testing EDI Maintain Their Motivation Despite Complexities and Obstacles," *Software Magazine*, Mar. 15, 1988, pp. 52-56, vol. 8, No. 4.

Chabrow, "Supply Chains Go Global—The Internet Levels the Geographic Playing Field and Lets Companies Reach into the Farthest Corners of the Planet for Partners and Customers," *Information Week*, Apr. 3, 2000, pp. 50, Issue No. 0010-4841.

"HK Trade and Transport EDI Launch set for July," *Newsbytes*, Mar. 20, 1995.

Dawne, "All Information is Local, IT Systems can Connect Every Corner of the Globe, but IT Manager are Learning they have to Pay Attention to Regional Differences," *Computerworld*, Apr. 10, 2000, pp. 88.

Homeland Security Rules Heighten Need for Supply-Chain Automation, As U.S. Customs Plans Stiffer Enforcement of Rules Governing Shipments to the Nation's Ports, U.S. Shippers Conducting International Business will Likely be Required to Implement More automated Supply-Chain Event Management and Transportation Management Systems, *InternetWeek*, May 1, 2003, Issue No. 1096-9969.

PR Newswire, Xporta Redefines Landed Cost With its Introduction of the First Real-Tie Solution for Domestic and International Shipments of all Commodities; Xporta Launches the Landmark Web-Based Decision-Support Solution That Enables Buyers, Suppliers and e-Marketplace to Quote Universal Landed Cost, Sep. 27, 2000, 5 pages, PR Newswire.

Charles W. Thurston, Mercosur's Size Requires Multiplicity in Ventures, Journal of Commerce, 5 Edition, Mar. 17, 1999, p. 7A, New York.

Christy Hudgins, International E-Commerce, Network Computing, Nov. 15, 1999, pp. 75-92.

Torrence, Dale O., "The Harmonized System of Tariff Classification: How It Will Help U.S. Exporters," Business America (pre-1986), May 13, 1985; 8, 000010; ABI/INFORM Global, pp. 22-24.

Office Action from U.S. Appl. No. 11/874,681 mailed Apr. 1, 2010.
Office Action from U.S. Appl. No. 11/874,681 mailed Sep. 20, 2010.
Office Action from U.S. Appl. No. 11/827,062 mailed Jan. 31, 2011.
International Search Report dated Sep. 25, 2008, for PCT/US2007/15731, filed Jul. 9, 2007.

Gisli Hjalmtysson, Robert Gray, "A lightweight mechanism to update code in a running program," Dynamic C++ classes, Usenix Annual Technical Conference (No. 98), 1998, pp. 1-18, Jun. 15-19, 1998, New Orleans, LA.

Jonathan Cook, Allessandro Orso, "MonDe: Safe updating though monitored deployment of new component versions," Copyright 2005, 4 pages, Las Cruces, NM; Atlanta, GA.

Michael J. Retting, Martin Fowler, Java World Floating Innovation, "Reflection vs code generation, Avoid runtime reflection when marshaling data," Nov. 2, 2001, pp. 1-9.

Dominic Duggan, Zhaobin Wu, "Adaptable objects for dynamic Updating of software libraries (abstract)," 7 pages, Hoboken, NJ.

Donald Bales, O'Reilly Media, Inc., "Top Ten Oracle JDBC Tips," Dec. 19, 2001, pp. 1-4.

Office Action for U.S. Appl. No. 11/827,062 mailed Jun. 7, 2011.
Office Action dated Dec. 22, 2011, for U.S. Appl. No. 11/874,681, filed Oct. 18, 2007.
United States Patent and Trademark Office, Notice of Allowance for U.S. Appl. No. 11/874,681, mailed Aug. 20, 2012, 24 pages, USA.

* cited by examiner

| 510 Nodes | 512 Groups | | 514 Group_Terms | | 516 Terms | |
|---|---|---|---|---|---|---|
| NODE_ID | NODE_ID | GROUP_ID | GROUP_ID | TERM_ID | TERM_ID | TERM |
| 1 | 1 | 1 | 1 | 50 | 50 | Grouper |
| 2 | 2 | 1 | 1 | 51 | 51 | Trout |
| 3 | 3 | 1 | 2 | 52 | 52 | Salmon |
| 4 | 4 | 2 | 2 | 53 | 53 | Bass |
| 5 | 5 | 2 | | | 54 | Rockfish |
| 6 | | | | | 55 | Eel |
| 518 Node_Terms | |
|---|---|
| NODE_ID | TERM_ID |
| 5 | 54 |
| 6 | 55 |
FIG. 5A
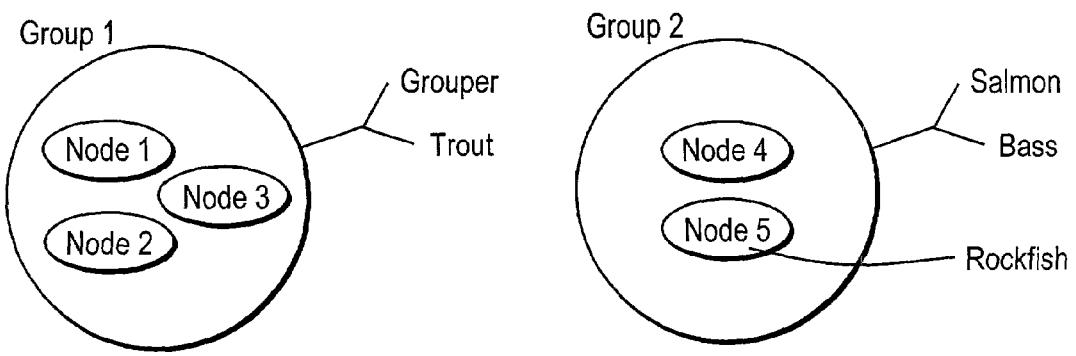
FIG. 5B  FIG. 5C
FIG. 5D

WIZARD

Country List
Canada
✓ Chile
  8524.99.00
  1310

HS Tree for Current Country
☐ Electrical Machinery
☐ Records, Tapes, and Other Recorded Media
  ☐ Other
  ☐ Other
  1312

Current Country: Canada

| HS Code | Description |
| --- | --- |
| 8524.99.10 | Magnetic Disks of an Educational, Scientific, or Cultural Character |
| 8524.99.20 | Other Software |

1314

[Cancel] [Up] [Next] [Finish] [Finish and Learn]
1316

FREIGHT RATE MANAGER

CROSS-REFERENCE TO RELATED APPLICATION

This application is a continuation-in-part of U.S. patent application Ser. No. 09/573,583, filed May 18, 2000, which is hereby incorporated by reference herein.

BACKGROUND

1. Field of the Invention

This invention pertains in general to estimating landed costs for domestic and internationally shipped goods and in particular to a computer system and method for automatically calculating the same.

2. Background Art

Estimating costing information for goods shipped internationally is a very complex process. Countries typically charge duties on imported goods based on the goods' classifications in the countries' harmonized tariff schedules. However, different countries often place identical goods in different classifications. In addition, different countries place different tariffs on goods even when the countries assign goods to the same class.

International treaties, such as trade agreements between two or more countries, may reduce or eliminate tariffs on certain goods. Countries may also have quotas, two-stage tariff systems, or anti-dumping and countervailing duties wherein the tariff on a good is determined by the amount of that good previously imported into the countries. There may also be restrictions on the types of goods that can be exported out of or imported into certain countries, or shipped to certain people or addresses.

In addition, shipping rates vary greatly for different types of goods and shipping methods. Moreover, different companies or other suppliers of goods frequently negotiate custom rates with one or more shippers that need to be considered when estimating landed costs. Plus, currency exchange rates fluctuate regularly.

All of the above factors make it extremely difficult to calculate costing information for a good. As such, it is difficult for a salesperson or other interested party to provide a reasonably accurate price quotation in real-time (e.g., while a potential buyer is on the telephone). Therefore, there is a need in the art for a way to provide a fast and accurate estimate of costing information for a good.

DISCLOSURE OF THE INVENTION

The above need is met by a freight rate manager that provides rules for calculating freight rates for use in a system that delivers real-time costing information. The freight rate manager includes a rate sheet input module for accepting data describing a rate sheet. In one embodiment, the rate sheet data is accepted in the form of a MICROSOFT® EXCEL® spreadsheet.

A rate sheet analyzer analyzes the rate sheet to identify potential errors, such as optical character recognition errors. In addition, the rate sheet analyzer applies heuristics and templates to the rate sheet in order to interpret the rates and other information contained therein. In one embodiment, the heuristics identify keywords in the rate sheet and use the keywords to select a template for interpreting the rate sheet. If a template matches the rate sheet, then the rate sheet analyzer interprets the rate sheet according to the template.

If the rate sheet analyzer does not find a matching template, a communications module preferably sends the rate sheet to another location or otherwise stores the rate sheet for subsequent analysis by developers. Preferably, the developers develop a new template in response to the rate sheet and transmit the new template to the freight rate manager via the communications module.

An accessorial charges module accepts information about accessorial charges. The outputs of the rate sheet analyzer and the accessorial charges module are provided to a rules generator which generates rules for calculating freight rates given the rates in the rate sheet and the accessorial charges. In one embodiment, the rules are in the Prolog computer language. The rules are preferably stored in a database from which the rules are accessible to components of the system that deliver real-time costing information.

BRIEF DESCRIPTION OF THE DRAWINGS

FIGS. 5A-D illustrate an example of how the cross-reference module in the HS module uses groups to maintain cross-references among nodes;

FIG. 13 is an illustration of an embodiment of the GUI for the harmonizer wizard in the catalog harmonizer.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1A:
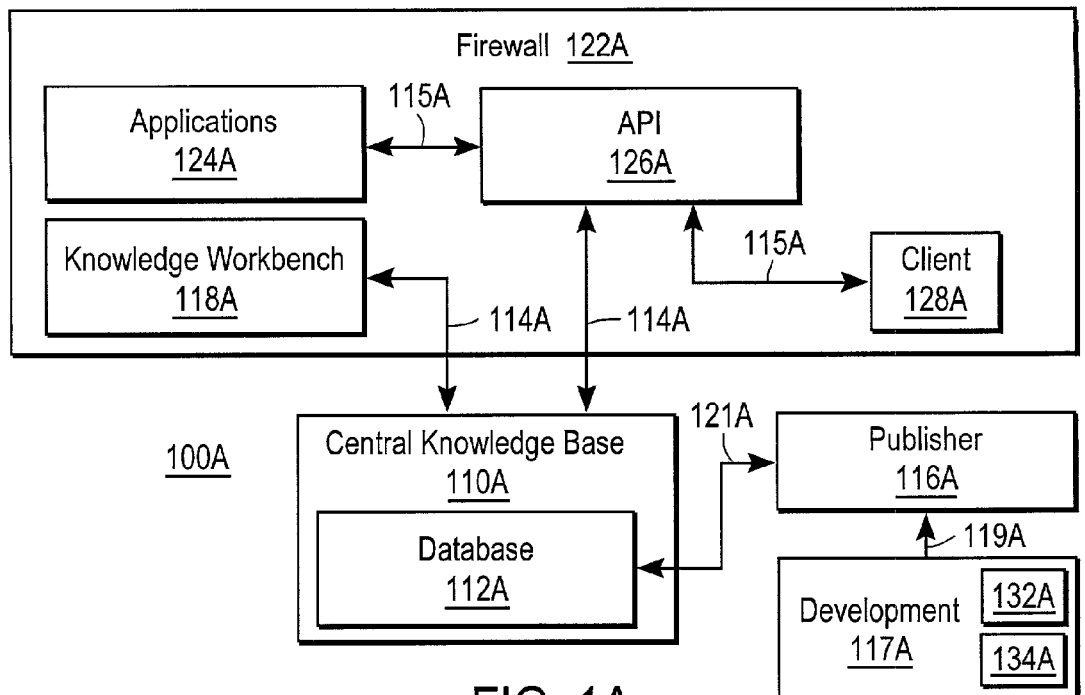
FIGS. 1A and 1B are high-level block diagrams illustrating embodiments of a system for delivering real-time costing information.
Figure 1B:
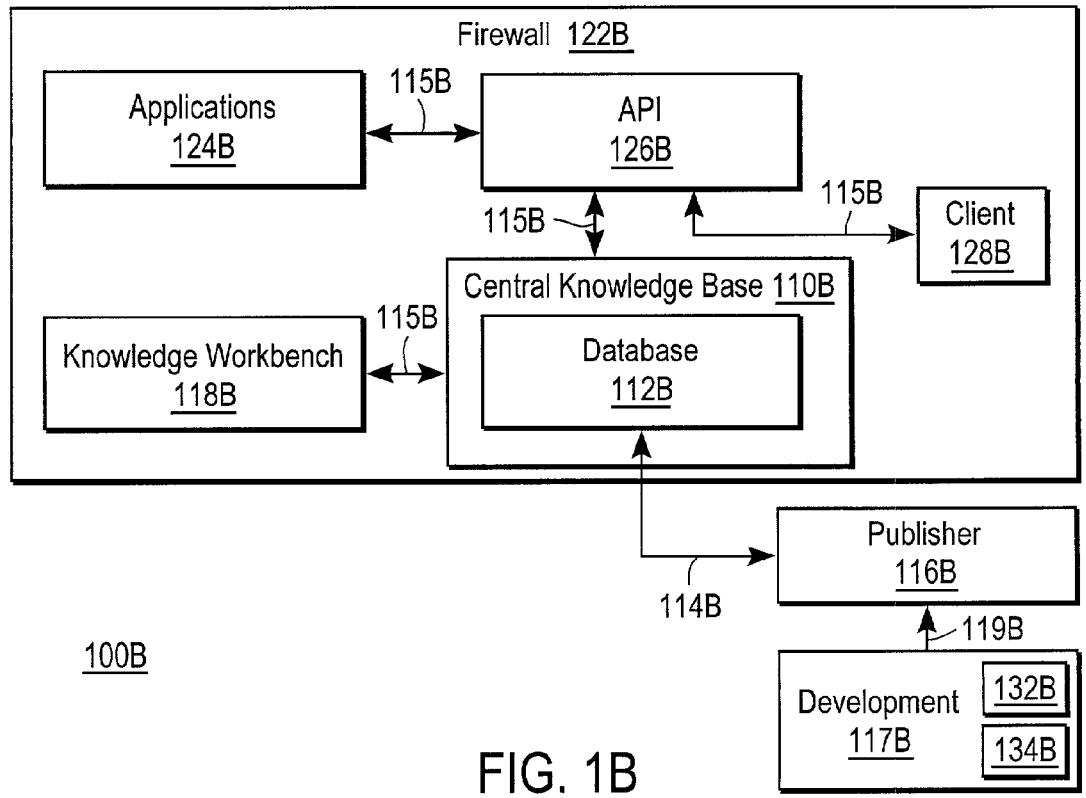

FIGS. 1A and 1B are high-level block diagrams illustrating embodiments of a system 100 for delivering real-time costing information related to goods that a user of the system is contemplating shipping to a buyer. Five questions that exemplify the types of questions posed by the prospective shipper are: (1) What will the goods cost the buyer? (2) Can the user sell the goods to the buyer? (3) When will the buyer receive the goods?(4) What documents will the buyer need in order to receive the goods? and (5) Where should the user warehouse the goods and the goods' subassemblies to minimize shipping costs and tariffs?

The answers to these types of questions are generically referred to as "costing information." This phrase is utilized because it is expected that questions of the first type, "What will the goods cost the buyer," will predominate. Still, it should be understood that "costing information" also refers to information not directly related to a "cost." For example, the answers to "whether a transaction is prohibited" or "what documents are required for a transaction" are types of costing information. The system 100 can also be used to provide costing information addressing questions other than those listed above.

The system 100 is adapted to provide costing information in real-time. In this description, the phrase "real-time" means fast enough to respond to someone or something that is waiting for the information. For example, an embodiment of the system 100 is used to provide estimates to a salesperson quoting costs to a potential customer and generates the estimate within a few seconds. Alternatively, an embodiment of the system 100 providing costing information as part of a larger computer-performed calculation may generate the information in under a second. The answers supplied by the system 100 are not necessarily exact, and may represent estimates based on the available data.

The answer to the first question, "what will the goods cost the buyer?" is commonly referred to as the goods' "landed cost." The "landed cost" for a quantity of goods is the total cost of shipping the goods from a specified origin to a specified destination, or, conversely, the total cost of receiving the goods at the stated destination. Typically, the landed cost includes components such as freight, insurance, customs tariffs, and taxes, in addition to the cost of the goods themselves. The exact landed cost is almost impossible to calculate in advance due to fluctuations in currency exchange rates, fuel costs, etc. Nevertheless, the system 100 provides an estimate of the landed cost that is accurate enough to be used by the interested parties. The present invention is designed to provide estimates for goods shipped internationally, although it can also be used to estimate landed costs for domestic shipments. In one embodiment, the present invention supports shipping to/from any country in the world. In another embodiment, the present invention supports only a subset of the world's countries. As used herein, the term "country" refers to nations, economies, trade zones, and/or any other entity. "Goods," as used herein, refers to articles of commerce. Typically, the goods are commodities, but this relationship is not required.

Since estimating a landed cost is one of the more important functions performed by the system 100 of FIG. 1, the system is sometimes referred to as a "landed cost system." FIG. 1A illustrates an application service provider (ASP) embodiment of the system 100A In the ASP embodiment, a central knowledge base 110A is located remote from a customer. As used herein, the term "customer" refers to an entity utilizing the landed cost system 100 and does not necessarily imply that the entity is in fact a customer of another entity. The term "customer" is utilized herein because, in one embodiment, the entity using the system 100 is in a customer/merchant relationship with an entity that operates the system. However, other embodiments, in which the "customer" is not in a customer relationship are within the scope of the present invention.

In one embodiment, the central knowledge base 110A is co-located with one or more servers at a co-location facility having high-speed access to the Internet. As is known in the art, the term "ASP" implies that the central knowledge base 110A supports many customers from the centrally managed co-location facility. However, the central knowledge base 110A may support one or only a few customers in some embodiments. In addition, the central knowledge base 110A, despite its name, may be a distributed system. Advantages of the ASP embodiment of the system 100A include lower startup and maintenance costs for the customer.

The central knowledge base 110A preferably includes a database 112A for storing information utilized in answering the questions stated above and is in communication with a publisher 116A via a communications link 121A. The communication link 121A preferably supports communications via the hypertext transport protocol (HTTP) and/or via the file transport protocol (FTP) over the transmission control protocol (TCP)/Internet protocol (IP). As such, the communication link 121A may include dedicated private links and/or public links such as the Internet, a telephone network, or another publicly-accessible network. In general, the communications link 121A may use any conventional communications technologies and communications media. The communications link 121A may also pass data through one or more other computer systems (not shown), such as routers, load balancers, and the like. In one embodiment, the communications link 121A is a local area network (LAN) at the co-location facility.

The publisher 116A preferably provides new and updated content to the central knowledge base 110A and database 112A. A development system 117A is preferably utilized to supply content to the publisher 116A and is preferably in communication with the publisher via another communications link 119A. In one embodiment, the communication link 119A between the development system 117A and the publisher 116A is a secure communications circuit, such as an encrypted T1 line. However, this link 119A, as with the other communications links described herein, can use any known communications technology or communications media. In one embodiment, moreover, the publisher 116A is located on the same computer system as the development system 117A and, therefore, the communications link 119A is simply an intra-computer communications link.

Another communications link 114A preferably couples the central knowledge base 110A to a knowledge workbench 118A behind a firewall 122A at a customer site. In one embodiment, this communications link 114A is a standard Internet connection and utilizes standard secure networking technologies, such as the secure sockets layer (SSL). The customer preferably utilizes the knowledge workbench 118A to view, add, delete, and/or modify data stored at the central knowledge base 110A. As is known in the art, the firewall 122A prevents unauthorized users from gaining access to the customer's computers and/or monitors transfers of information to and from the customer's computers. In one embodiment, the customer does not have a firewall 122A. Nevertheless, the firewall 122A is representative of a logical division between the customer and the Internet at-large in which the central knowledge base 110A is located.

The customer also preferably has an applications server 124A and a client 128A. These two entities 124A, 128A preferably access the functionality of the central knowledge base 110A via an applications programming interface (API)

126A provided by the knowledge base. The API 126A is illustrated as being within the customer's firewall 122A to indicate that the API is accessible to computer systems executing behind the firewall that are coupled together via another communications link 115A, such as the customer's LAN. In reality, the API 126A is preferably a publicly-accessible interface to the central knowledge base 110A. As such, the API 126A is illustrated as being in communication with the central knowledge base 110A via the SSL-based Internet communications link 114A.

The applications server 124A preferably holds customer-provided and third party applications that utilize the functionality of the central knowledge base 110A. The client 128A is preferably utilized by a user to access the functionality of the central knowledge base 110A. For example, the client 128A in one embodiment is a computer system having a web browser that is utilized by a person to obtain a landed cost estimate through interactions with the central knowledge base 110A. Although the client 128A is illustrated as being within the firewall 122A, the client may be located outside the firewall or anywhere else where it can access the API 126A.

In contrast to the ASP embodiment of FIG. 1A, FIG. 1B illustrates an alternative embodiment of the landed cost system 100B wherein the entire system, with the exception of the publisher 116B and development system 117B, is located within the customer's firewall 122B. In FIG. 1B, the central knowledge base 110B, knowledge workbench 118B, applications server 124B, and client 128B communicate via the customer's internal computer network 115B. In one embodiment, the customer's network 115B is a conventional local or wide area network utilizing conventional communications technologies to support communications among the various computer systems and other entities at the customer's site. As in the ASP embodiment of the system 100A, the development system 117B preferably communicates with the publisher 116B via a secure communications link 119B. Advantages of the non-ASP embodiment include greater security and faster response times, greater control over the content and software in the system 100B, etc.

In this embodiment of the system 100B, the central knowledge base 1110B is preferably dedicated to the single customer at whose facility it is located and there are preferably multiple central knowledge bases installed at multiple customers. If necessary or desired to support the customer's requirements, however, a customer can have multiple central knowledge bases 110B. The publisher 116B is preferably in communication with each customer's central knowledge base 110B.

In either embodiment, the entities in the landed cost system 100 preferably perform substantially the same functions except for the differences necessitated by the different architectures. In addition, additional embodiments of the system 100, wherein one or more other entities are inside or outside of the firewall and/or local or remote to the customer are within the scope of the present invention.

Figure 2:
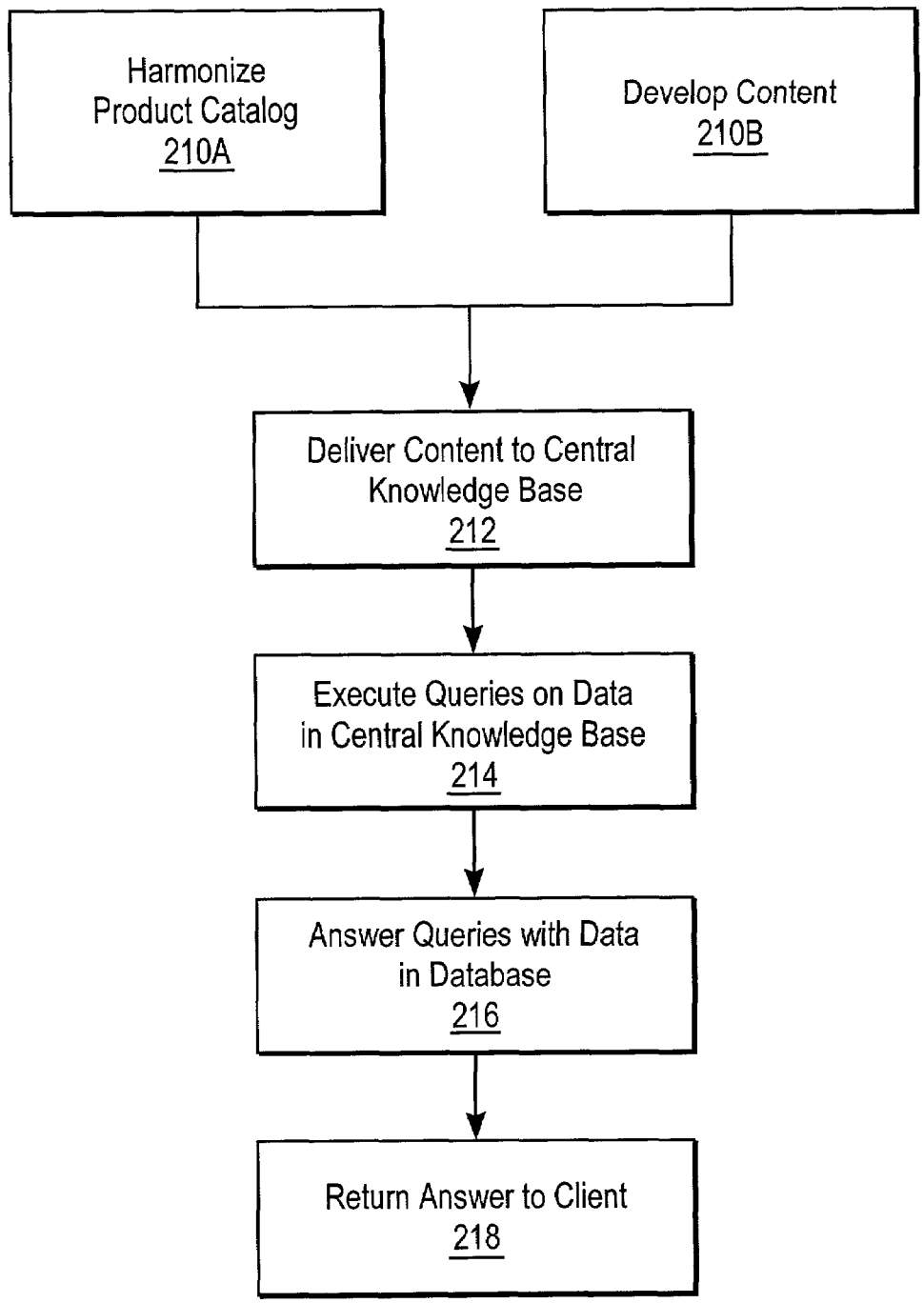
FIG. 2 is a flowchart illustrating a method for delivering costing information according to an embodiment of the system of FIG. 1.

FIG. 2 is a flowchart illustrating a method for delivering costing information, such as a landed cost estimation, according to an embodiment of the system 100 of FIG. 1. It should be understood that the FIG. 2 represents only one possible embodiment of the present invention and the steps illustrated therein may be performed in a different order or omitted, or additional steps may be added, in alternative embodiments of the method.

Initially, a user utilizes the knowledge workbench 118 to harmonize 210A a catalog of goods supplied by the customer according to one or more countries' harmonized systems (HSs). As part of this process, each good is matched with an HS code describing tariffs and other factors that apply to the good. During this phase, the user also preferably utilizes the knowledge workbench 118 to create other custom information about the customer, such as custom freight rates, in the database 112. The user preferably utilizes the knowledge workbench 118 to store 212 the harmonized catalog and other custom information in the database 112 of the central knowledge base 110. In an alternative embodiment of the system 100, some or all of this information is provided by the user when asking for the costing information and is not stored in the database 112.

Asynchronously with the harmonization of the catalog, a developer preferably utilizes the development system 117 to develop 210B content for the central knowledge base 110. This content includes information such as default freight rates and delivery schedules, denied party and license requirements, other compliance information, a unified HS tree representing the HSs of multiple countries, associated tariff information, etc. Although the developer operates asynchronously from the user, the developer preferably develops at least some of the content, such as the unified HS tree, before the customer harmonizes the catalog (since the customer would otherwise be unable to perform the harmonization). The developer preferably utilizes the publisher 116 to publish 212 the information to the central knowledge base 110.

Once the central knowledge base 110 is loaded with information, a user at the customer preferably utilizes the client 128 to access the API 126 and execute 214 queries on the information. Alternatively, the user may execute an application module on the application server 124 and cause it to execute 214 query. The queries request costing information with respect to one or more specified goods in the customer's product catalog and other variables in the system. Modules in the central knowledge base 110 determine the answers to the queries and return 218 the answers to the user via the client 128.

Figure 12:
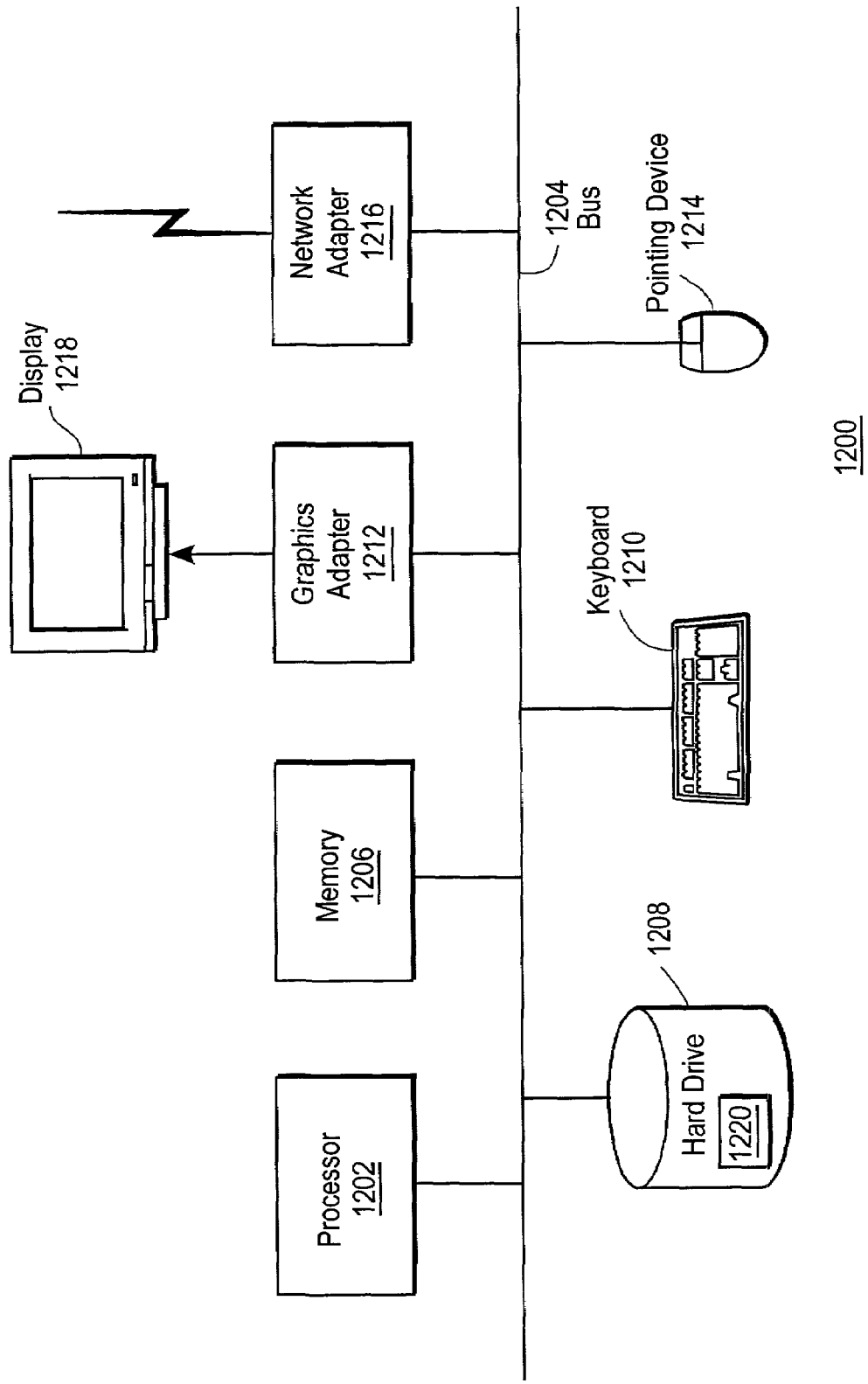
FIG. 12 is a high-level block diagram illustrating a computer system for use as the client, central knowledge base, applications server, knowledge workbench, and/or another device illustrated in FIG. 1.

FIG. 12 is a high-level block diagram illustrating a computer system 1200 for use as the client 128, central knowledge base 110, applications server 124, knowledge workbench 118, publisher 116, development system 117, and/or another device illustrated in FIG. 1. FIG. 12 illustrates at least one processor 1202 coupled to a bus 1204. Also coupled to the bus 1204 are a memory 1206, a storage device 1208, a keyboard 1210, a graphics adapter 1212, a pointing device 1214, and a network adapter 1216. A display 1218 is coupled to the graphics adapter 1212.

The processor 1202 may be any specific or general-purpose processor such as an INTEL x86 or POWERPC-compatible central processing unit (CPU). The storage device 1208 may be any device capable of holding large amounts of data, like a hard drive or some other form of fixed or removable storage device. The memory 1206 holds instructions and data used by the processor 1202. The pointing device 1214 may be a mouse, track ball, light pen, touch-sensitive display, or other type of pointing device and is used in combination with or instead of the keyboard 1210 to input data into the computer system 1200. The network adapter 1216 couples the computer system 1200 to a computer network via a communications link such as link 114, 115, 119, or 121.

Program modules 1220 for providing the functionality attributed to the computer system are preferably stored on the storage device 1208, loaded into the memory 1206, and executed by the processor 1202. Alternatively, hardware or software modules may be stored elsewhere within the computer system 1200. As used herein, the term "module" refers to computer program logic, data, and/or any software, hardware or circuitry utilized to provide the functionality attributed to the module. The types of hardware and software within the computer system 1200 may vary depending upon how the computer system is utilized. For example, a computer system used as the central knowledge base 110 is likely to have greater processing power and storage capacity than a typical personal computer or portable electronic device used as the client 128. In addition, the central knowledge base 110 may lack a display 1218 and/or other components.

Returning to FIGS. 1A and 1B, the user preferably uses the client 128 to interface with and send queries to the central knowledge base 110 via the API 126. In other embodiments, the client 128 interfaces with a dedicated client server (not shown) or another of the entities illustrated in FIG. 1. In one embodiment, the client 128 is a personal computer executing browsing software such as NETSCAPE NAVIGATOR®, MICROSOFT INTERNET EXPLORER®, a terminal emulator, or dedicated client software. Alternatively, the client 128 is a wired or wireless telephone, a personal digital assistant (PDA), or some other electronic device. Although only one client 128 is illustrated in each of FIGS. 1A and 1B, embodiments of the present invention may have multiple clients.

The central knowledge base 110 preferably includes a conventional application server supporting the API 126 and the client 128 preferably accesses the API using known HTTP communications techniques. In one embodiment, the API 126 is implemented as JAVA® and component object module (COM) plug-ins. The plug-ins preferably communicate with the other elements in the central knowledge base 110 and/or other entities in the system 100 through conventional communication transports including the extensible markup language (XML), the simple object access protocol (SOAP), and/or direct Enterprise JavaBeans (EJB) calls.

The user can preferably interact with the system 100 in one of three primary manners: stateful, semi-stateful, or stateless. The differences among these manners are in the amount of data a query passes to the system 100 via the API 126. In stateful interactions, only data that cannot be known in advance (such as the quantity, buyer, etc.) are passed to the system 100 with the query. All other data relied upon by the system 100 to respond to the user's query are already stored in the system, typically in the central knowledge base 110. In semi-stateful interactions, some of the data stored in the system 100 are overridden by data passed with the query via the API 126. FIG. 2 illustrates the stateful and semi-stateful interactions. In stateless interactions, all of the data stored in the system 100 that can be overridden by data passed with the query via the API 126 are overridden. In one embodiment, the data that cannot be overridden via the API 126 include freight rates, tariffs, VAT rates, etc. If the system 100 lacks data needed to answer a query, either because the data are not in the central knowledge base 110 and/or not in the query, one embodiment returns an error message to the client 128 explaining the error and how to rectify it.

In general, the system 100 is easier to use if frequently-utilized data are stored in the system rather than being included with every query. Moreover, a dedicated group of developers or users can store the frequently-utilized data in the system 100 in advance, leaving the majority of users free to use the system in a stateful or semi-stateful manner. For example, in a stateful embodiment where large amounts of data are stored by the system 100, a user can obtain a landed cost estimate by merely identifying a type of good, a ship-to destination, and a quantity. For this reason, the stateful and semi-stateful interactions are preferred.

In response to the query received from the client 128, the application server in the central knowledge base 110 delivers the costing information, such as the landed cost estimate, to the client. In one embodiment, the application server provides the answers in formats such as the hypertext markup language (HTML), XML, JAVA® applets, JavaScript scripts, voice or other audio prompts, etc. In this latter embodiment, a user uses a telephone to input touch-tone signals to the central knowledge base 110 via the API 126 and receives voice prompts and audio data in response.

Figure 3:
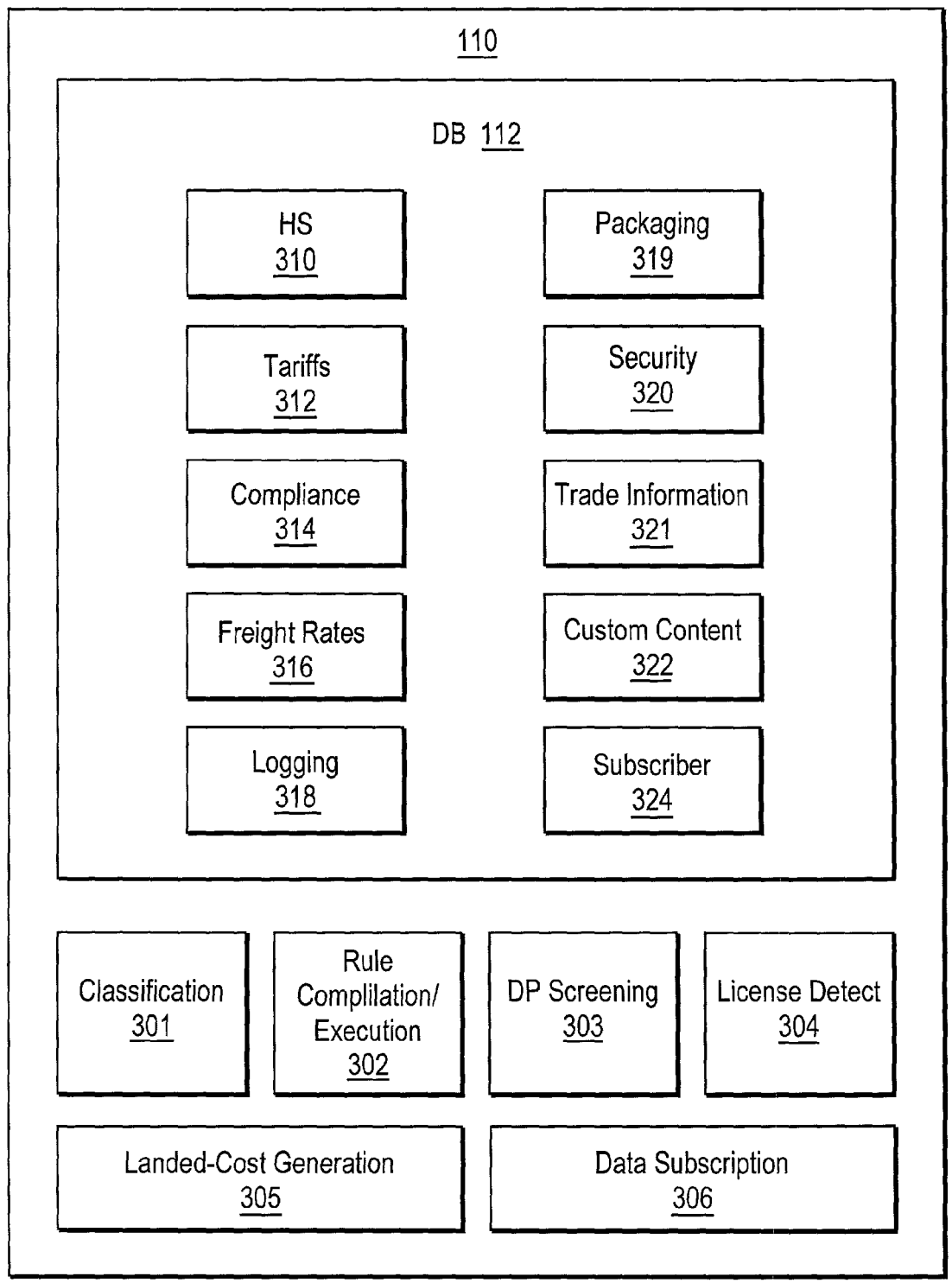
FIG. 3 is a high-level block diagram illustrating modules in the central knowledge base and database according to a preferred embodiment of the system.

FIG. 3 is a high-level block diagram illustrating modules in the central knowledge base 110 and database 112 according to a preferred embodiment of the system 100. In general, the central knowledge base 110 holds information utilized to provide the costing information. In the ASP embodiment of FIG. 1A, the central knowledge base 110A preferably holds information relevant to multiple customers while in the dedicated embodiment of FIG. 1B the central knowledge base 110B preferably holds information relevant to one customer.

The central knowledge base 110 preferably contains a classification module 301 for finding the best harmonized system (HS) code in which to classify a good. The central knowledge base 110 also preferably holds a rule compilation/execution module 302 for compiling and/or executing rules stored in the database 112. Compiling certain rules may be desired because compiled rules generally execute faster than interpreted rules (i.e., rules that are executed from an uncompiled state). The central knowledge base 110 also preferably holds a denied-party screening module 303 for determining whether a transaction involves prohibited individuals, companies, countries, addresses, etc., a license detection module 304 for interfacing with the compliance module 314 to detect whether an export license is needed to export a particular good, a landed-cost generation module 305 for generating real-time landed-cost quotes from information held in the database 112 or otherwise provided to the system 100, and a data subscription service module 306 for controlling updates to the data in the database 112.

Preferably, the above-described modules are independent and can be installed and executed separately. In addition, the modules are preferably platform independent and in one embodiment the modules are written in JAVA and are Java 2 Platform Enterprise Edition-(J2EE-) compliant.

The database 112 preferably holds data modules holding data utilized by the other modules in the central knowledge base 110. Much of the data in the database is tabular and thus is stored in conventional database formats. Some of the data, however, is ad hoc, meaning that the data is intended to perform a specific purpose. Preferably, ad hoc content is implemented as rules, either in uncompiled or compiled form. Thus, ad hoc content is a form of executable data. In one embodiment, the rules are represented as Prolog-language code, although other embodiments may use different representations. The rule-based representation of ad hoc data is preferred because it allows algorithmic behavior of the system 100 to be altered simply by altering the data held in the database 112.

The database 112 preferably holds an HS module 310, which in turn preferably holds a unified HS code hierarchy (also referred to as the unified "HS tree"). The HS, also known as the Harmonized Commodity Description and Coding System, is a multipurpose international good nomenclature developed by the World Customs Organization (WCO). The HS comprises about 5,000 commodity classifications, each identified by a six digit code (although countries can and typically do add additional digits) and having an associated description, arranged in a hierarchical structure. The system is used by more than 177 countries and economies as a basis for their customs tariffs and over 98% of the merchandise in international trade is classified in terms of the HS. The United States uses a Harmonized Tariff Schedule (HTS) based on the HS. The HS tree in the HS module 310 is "unified" because it holds data representative of all of the HS trees of the countries supported by the system 100.

Returning to FIG. 3, a tariffs module 312 preferably holds information about duties, taxes, and fees including preferences, value added taxes (VATs), anti-dumping duties, countervailing duties, duty units, etc. applied by the country or countries supported by the system 100. The tariffs are indexed by the countries' HS codes. The tariffs module 312 additionally holds rules for applying the tariffs, such as the de minimis, non-commercial shipments, and effectivity dates rules. The tariffs module 312 also preferably holds information about miscellaneous accessorial charges such as inspections, insurance, etc. applied or required by the various countries.

A compliance module 314 preferably holds information for determining whether a proposed shipment complies with the laws of the countries involved. The compliance module 314 preferably holds a denied parties module that stores data representative of import and export restrictions imposed by the countries supported by the system 100. The compliance module 314 also preferably holds information about import/export licenses granted to certain parties, customers, etc. In addition, the compliance module 314 preferably holds quota information describing import (and/or export) quotas enforced by the countries. The compliance module 314 also preferably holds rules for applying the content in the module to proposed shipments contemplated by the system 100.

A freight rate module 316 preferably holds information describing rates and average shipping times for shipping goods domestically and internationally. In general, the freight rates are divided into two broad categories: custom rates and default rates. The custom rates typically result from negotiations between the customer and one or more shippers and are preferably utilized when determining a landed cost for goods shipped by that customer. Accordingly, the freight rate module 316 preferably holds the custom freight rates for the one or more customers that use the system 100. The default freight rates are preferably utilized by the system 100 in the absence of custom freight rates. In one embodiment, the default freight rates are published rates for large shipping companies such as United Parcel Service (UPS) and DHL Worldwide Express.

A logging module 318 preferably logs and stores logs of transactions and other data generated by the system 100. In one embodiment, the logs include transaction reports, billing records, and debugging information. The logs also preferably include information describing variances between quoted landing costs (or other quoted information) and the actual landing costs in order to verify the accuracy of the system 100.

A packaging module 319 preferably holds information related to packaging calculations, such as weights and dimensions. In one embodiment, the information includes rules describing the space occupied by certain types of goods in certain configurations. The dimensions occupied by goods, and calculated by the rules, may not scale linearly with the quantity of the goods. For example, assume a good in an individual contain may occupy a first amount of space. However, a quantity of the good must be shipped on a pallet that occupies a second amount of space. In this example, the packaging module 319 includes rules that identify and account for the pallet in order to provide accurate estimates of the required packaging dimensions and/or the storage space required to ship the goods.

A security module 320 preferably holds security information utilized by the system 100. In one embodiment, the security information includes login/password pairs utilized by users to log into the system 100, permissions information describing the features and data accessible to the users, and any other information that is necessary or desired to maintain security in the system 100.

A trade information module 321 preferably holds miscellaneous trade information utilized by the system. This information includes geographic data describing the locations of countries, provinces, counties, cities, airports, seaports, and/or other locations necessary or desired to generate a landed cost estimate or answer other questions posed by the user. The trade information module 321 also preferably holds current exchange rates for the currencies of countries supported by the system 100. The module 321 also holds Incoterm (International Commerce Term) definitions in a format that can be utilized by the system when determining landed cost estimates.

A custom content module 322 preferably holds custom content supplied by, and pertinent to, the one or more customers utilizing the system 100, with the exception of the custom freight rates stored in the freight rate module 316. In one embodiment, the custom content includes catalog trees hierarchically identifying categories and subcategories of goods supplied by a customer and the goods' respective HS codes, product information such as SKUs, names, descriptions weights, dimensions, United States Export Control Classification Numbers (ECCNs), if applicable, country of origin information, and/or preference flags. The custom content module 322 in one embodiment also contains kit information (e.g., bills of material, top-level-assembly information, configuration information, etc.), cross-references, a customer-specific glossary to aid in classification, custom classification terms, accessorial charges, tariff rules, denied parties, licenses and/or exceptions, quotas, and/or compliance rules.

In general, customers can provide the custom content to the custom content module 322 through use of the tools described herein. The custom content in the module 322 overrides the default content specified by the other modules in the central knowledge base 110 and/or database 112. In the ASP embodiment of the system 100A, each customer preferably supplies custom content to the database 112A, which the system then uses when answering questions posed by users associated with the customer. Thus, the database 112A holds custom content for multiple customers. In the embodiment of the system 100B, the database 112B preferably holds custom content associated with only the single customer with which the system is associated.

A subscriber module 324 in the database 112 preferably interfaces with the data subscription module 306 and the publisher 116 to update non-custom content stored in the database. The publisher 116 is preferably a module executing on a conventional computer system, such as the development system 117. In one embodiment, the data subscription module 306 has a digital certificate and a login/password pair that it provides to the publisher module 116 to authenticate itself and allow the two modules to communicate securely.

Content is preferably provided to the publisher 116 by developers utilizing the development system 117. In addition, the publisher 116 may receive content from other sources, although the developers may use the development system 117 to establish rules for filtering and/or formatting the content received by the publisher. For example, the publisher 116 may receive data related to currency exchange rates and denied parties from third-party information providers. The development system 117 preferably receives content via conventional means, such as via a network connection (not shown) or via optical or magnetic media (not shown).

The developers preferably utilize the development system 117 to organize data to be distributed by the publisher 116 into compressed, self-contained, self-extracting packets called "datapacks." Each datapack contains the new content and computer-executable instructions for unpacking and applying the content to the central knowledge base 110. A datapack also preferably contains a digital signature, checksum, and/or other information for authenticating the datapack. In one embodiment, datapacks are generated on a daily basis in order to update exchange-rate and other volatile data in the database 112.

In one embodiment, the data subscription module 306 in the central knowledge base 110 initiates a transfer of datapacks from the publisher module 116 to the subscriber module 324. For example, the data subscription module 306 may initiate an update at scheduled intervals, such as every day. In another embodiment, the publisher module 116 initiates a connection with the data subscription module 306 to commence an update. In either case, the publisher module 116 preferably authenticates the identity of the data subscription module 306, and then sends the datapack or datapacks containing the update to the data subscription module. The data subscription module 306, in turn, preferably utilizes the digital signature and/or checksum to verify the integrity of the datapack. In one embodiment, customers can subscribe to particular content. The data subscription module 306 ensures that the publisher only provides the customer's subscriber module 324 with datapacks containing the subscribed-to content.

Then, the subscriber module 324 unpacks and executes the content in the datapack, thereby updating the content in the central knowledge base 110. Preferably, only non-custom content is updated in this manner. Accordingly, it is incumbent on the customers to update their custom content. Preferably, the content in the central knowledge base 110 remains available while the content is being updated, thereby allowing updating without interrupting the operation of the system 100.

In one embodiment, after the datapacks are transferred and the subscriber module 324 updates the content of the central knowledge base 110, the data subscription module 306 sends status information to the publisher module 116 indicating whether the update was successful. If the datapacks were not successfully transferred to the central knowledge base 110 or the update did not complete successfully, the data subscription module 306 preferably sends diagnostic information to the publisher module 116. A developer can then analyze the diagnostic information to determine likely problems and solutions.

In order to reduce the likelihood that the central knowledge base 110 enters an inconsistent state, the subscriber module 324 preferably performs an update as a large atomic transaction. The final version state, which indicates the update level of the software in the central knowledge base 110, is preferably the last data written by the subscriber module 324. If the update fails midway through the transaction, due, for example, to a power failure, hardware error, or software error, the subscriber module 324 preferably automatically returns the central knowledge base 110 to its prior state. At this point, the update can be attempted again. This behavior enhances the fault-tolerant capabilities of the central knowledge base 110.

Figure 4:
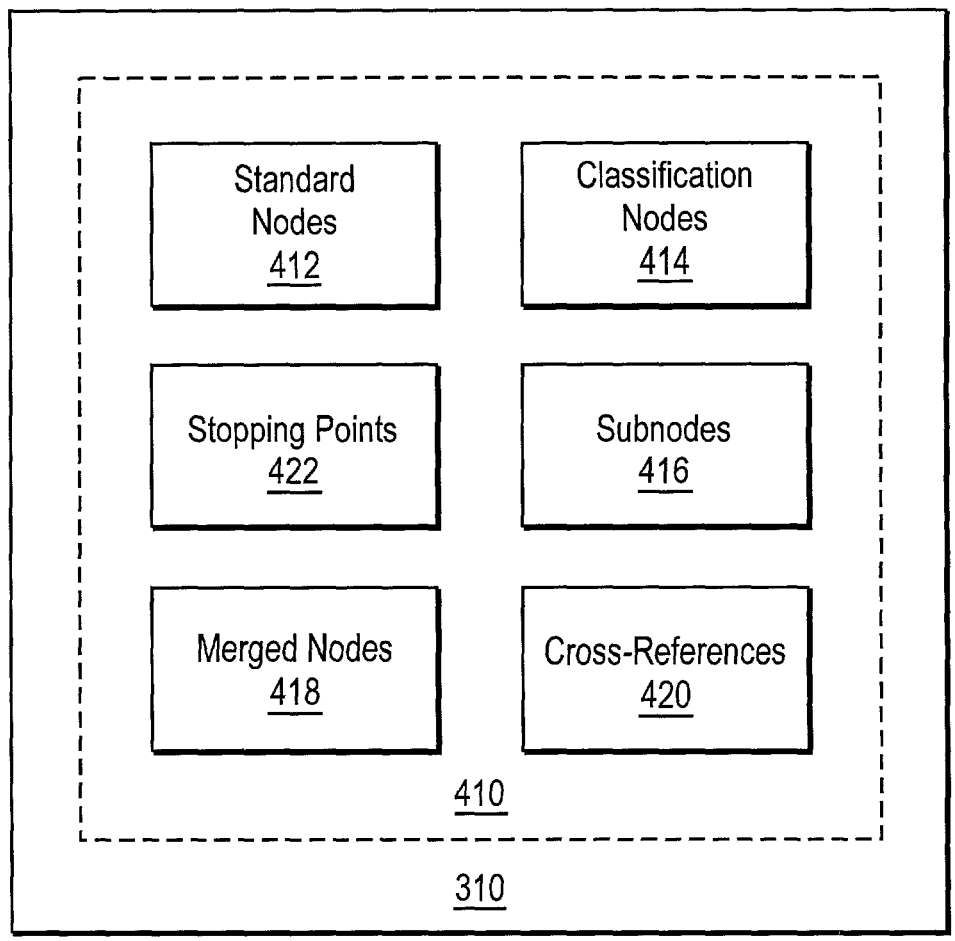
FIG. 4 is a high-level block diagram illustrating the Harmonized System (HS) module of FIG. 3.

FIG. 4 is a high-level block diagram illustrating the data within the unified HS tree module 410 in the HS module 310 of FIG. 3. Each HS classification is represented by a node in the tree. As stated above, the HS provides six digits of precision for classifying goods, although countries often add additional digits in order to classify goods with greater precision. In the unified HS tree 410, the nodes near the top of the tree represent codes at six or fewer digits of precision, while descendent nodes below the top nodes represent codes at more digits of precision than their respective ancestor nodes. Leaf nodes represent HS codes at the full number of digits of precision. Thus, United States classification code "8501," for "Electric Motors and Generators," is represented by a node near the top of the tree. Code "8501.10," for "Motors of an Output not Exceeding 37.5 W" is represented as a descendent of the node for "8501." Code "8501.10.20," for electric motors of under 18.65 W that are "Synchronous, valued not over $4 each," is represented as a leaf node. Although the HS trees of different countries are often similar at the high-level (i.e., at nodes of six or fewer digits of precision), the trees often differ at the lower-levels due to the extra digits of precision added by the respective countries.

As illustrated in FIG. 4, the unified HS tree 410 is comprised of several different types of nodes and cross-references between nodes. Standard nodes 412 are nodes corresponding to particular countries' classifications that have not been altered by merging, cross-referencing, etc. as described below. For example, if a particular country has a classification that is unique among the HSs of the countries supported by the system, the classification is represented in the unified HS tree 410 by a standard node.

The unified HS 410 tree also preferably contains classification nodes 414. "Classification nodes" are nodes that account for logical classifications in the HS that are not distinguished by HS codes. For example, assume the HS contains classifications as follows:

| | |
|---|---|
| 1234.20 | Widgets |
| | made of steel: |
| 1234.20.10 | lubricated |
| 1234.20.20 | not lubricated |
| | made of wood: |
| 1234.20.30 | sanded |
| 1234.20.40 | not sanded |

In this example, the classifications "made of steel" and "made of wood" do not have associated HS codes and would not be represented in the unified HS tree 410 without the use of classification nodes.

The unified HS tree 410 also preferably contains subnodes 416. Subnodes 416 are nodes below the standard leaf nodes in the HS tree 410. Some countries' HS trees have additional classifications, such as lists of exceptions, beneath the leaf nodes of their respective HS trees. For example, a leaf node for widgets made of sanded wood may have exceptions for blue widgets and red widgets and there may not be HS codes for the blue and red widget exceptions. When this situation occurs, the system 100 preferably manufactures subnode codes using the convention HSCodeofParent:ExceptionNumber. For example, if the HS code for widgets is 1234.20.20, the system 100 preferably creates subnode code 1234.20.20:1 to classify blue widgets and 1234.20.20:2 to classify red widgets. Different embodiments of the system 100 can use different representations, such as text strings or other tokens, for the exception numbers. Thus, the representation of the exception number can be tailored to match particular countries' classification styles. The subnodes allow the harmonization and tariff calculations to be extended deeper in the HS tree 410, so that the system 100 works the same for subnodes (i.e., exceptions) as it does with official HS codes. Preferably, a customs official reviewing customs documents that refer to subnodes recognizes, or is told, that the portions of the HS codes after the colons refer to exceptions.

The unified HS tree 410 also preferably contains merged nodes 418 sharing the same set of HS terms. A merged node is created by merging nodes from two or more countries' HS trees to produce a single node shared by those countries and having a single shared node description. Merged nodes are desirable because they save space by compacting the HS tree 410 and make it easier to classify a good in the HS trees of multiple countries.

In one embodiment of the system 100, nodes are merged in three different situations. First, nodes are preferably merged when the nodes are semantically and syntactically identical, i.e., the nodes have the same parent, the same HS code, and the same description. Preferably, node descriptions from different countries' HSs are considered the same even if they contain minor textual differences. For example, extra blanks, different line breaks, or other minor differences are preferably ignored. Likewise, differences in commas, semicolons, colons, dashes, braces, parentheses, quotes, and periods are preferably ignored and certain symbols, such as "=," "&," and "%" are treated as equivalent to their corresponding words. In one embodiment, if the text of two or more node descriptions contains the word "other," all of the siblings of the two nodes are compared. The two nodes are merged only if the siblings are the same.

Second, two or more nodes are preferably merged when the nodes are semantically identical and syntactically identical (again, ignoring minor textual differences), except for their HS codes, which differ. In other words, the nodes are merged when the nodes have identical parents and descriptions, but different HS codes. In this case, the resulting merged node is associated with all of the merged nodes' HS codes.

Third, two or more nodes are candidates for merging when the nodes are semantically identical but syntactically different. In other words, the parents of the candidate nodes are the same and the HS codes are the same, but the classification descriptions are syntactically different but semantically identical. For example, one description states "cobalt oxides; commercial cobalt oxides" and the other description states "oxides of cobalt, including those intended for commercial use."

Preferably, the development system 117 contains a node merging module 132 for performing automatic and assisted merging of nodes. In one embodiment, the node merging module 132 automatically merges nodes fitting the first two situations described above. The node merging module 132 preferably merges nodes fitting the third situation—the parents of the candidate nodes are the same and the HS codes are the same, but the classification descriptions are syntactically different—with developer input. In one embodiment, the node merging module 132 presents a developer with a graphical description of the HS trees of two or more countries. The node merging module 132 identifies two or more nodes that are candidates for merging under the third situation and presents the nodes to the developer. The developer then indicates whether to merge the nodes. If the developer indicates to merge the nodes, the developer also preferably indicates which of the nodes' descriptions to apply to the merged node. Because merging nodes often produces a new common parent for nodes further down the trees, this process continually finds new candidate nodes for merging. Therefore, the process is preferably repeated until all of the leaf nodes are reached.

When merging two or more related nodes is not possible, then the system 100 preferably utilizes a cross-reference between the nodes. For example, if two nodes are semantically identical but have different parent nodes, or two nodes are semantically similar, but not identical, then the nodes are linked by a cross-reference. Although cross-referenced nodes may not necessarily have exactly equivalent descriptions, the descriptions are preferably such that no good could fall within one node and not within the cross-referenced node.

Preferably, the developer utilizes a cross-reference module 134 in the development system 117 to create and maintain the cross-references 420 among the nodes. In one embodiment, the cross-reference module 134 shares functionality with the node merging module 132, i.e., the same module may perform both node merging and cross-reference generation.

A preferred embodiment of the cross-reference module 134 maintains cross-references between HSs of multiple countries by assigning nodes to groups. All nodes assigned to a particular group are deemed to have the same meaning. Therefore, to find nodes that are cross-referenced to a given node, the cross-reference module 134 finds all groups to which the given node belongs. Each of the nodes in those groups is a cross-reference.

FIGS. 5A-D illustrate an example of how the cross-reference module 134 uses groups to maintain cross-references. FIG. 5A illustrates five different tables. The "Nodes" table 510 contains six node_IDs, identifying six nodes. The "Groups" table 512 associates the node_IDs with particular groups identified by group_Ms. In this example, nodes 1, 2, and 3 are associated with group 1 and nodes 4 and 5 are associated with group 2. Thus, nodes 1, 2, and 3 are deemed to have one meaning and nodes 4 and 5 are deemed to have another meaning.

The "Group_Terms" table 514 associates one or more term_IDs with each of the groups. In this example, group 1 is associated with term_ID's 50 and 51. Each term_ID identifies a particular good that falls within the group. The "Terms" table 516 identifies the actual good or class of goods associated with each term_ID. For example, term_ID 50 is associated with "grouper" while term_ID 53 is associated with "bass." In one embodiment of the present invention, an additional table, "Node_Terms" 518, specifies exceptions to the shared classifications of nodes in the groups. For example, the Node_Terms table 518 specifies that node 5 is also associated with term_ID 55 (rockfish). The other nodes in the same group as node 5 (only node 4 in this example), are not associated with term_ID 55.

FIG. 5B graphically illustrates that group 1 contains nodes 1, 2, and 3, and that all of the nodes in group 1 include grouper and trout. FIG. 5C graphically illustrates that group 2 contains nodes 4 and 5. All of the nodes in group 2 include salmon and bass, while only node 5 includes rockfish. FIG. 5D graphically illustrates that node 6 includes eel (this relationship is defined in the Node_Terms table 518).

Thus, to find nodes in other countries' HSs that cross-reference to a leaf node in a first country's HS, the cross-reference module 134 preferably identifies the group to which the leaf node belongs. The other nodes in the same group are the cross-referenced nodes. Preferably, heuristics in the cross-reference module 134 detect cases where node/group equivalency is not true for a particular good (such the case where rockfish is associated with node 5 but not with the other node in the group 2, node 4).

From the other direction, if a term_ID is known for a good being classified, then the cross-reference module 134 preferably uses the Group_Terms 514 and Node_Terms 518 tables to identify the groups and/or nodes associated with the term_ID. Then, the module 134 uses the groups table 512 to identify the cross-referenced nodes. In this manner, the cross-reference module 134 tracks cross-references between the nodes of various countries' HS trees.

Returning to FIG. 4, the unified HS tree 410 also preferably holds nodes that are identified as potential stopping points 422. In one embodiment, a node is a potential stopping point in a particular country's HS tree if (1) the duty rates for all of the children of the given node are equivalent; (2) the tax rates for all of the children of the given node are equivalent; (3) any other rates for the children of the given node are equivalent; (4) the structure of the rates are equivalent across all of the child nodes (e.g., the rates are calculated as a percentage, fixed fee, etc. for all of the children nodes); and (5) the rules and other information in the central knowledge base 110 and database 112 that govern landed cost rates are equivalent for all of the children of the given node. Stopping points are used to efficiently classify goods, as described in more detail below.

In order to calculate the last of these factors, whether the rules and other information are equivalent, one embodiment of the system 100 parses all of the rules and other information and builds a map between the rules and information and the nodes to which they apply. Then, the rules and information are applied to all of the children of the nodes in the map to which they were initially applied. At this point, the nodes that meet all of the factors described above are stored in the unified HS tree 410 as potential stopping points 422. The process of generating the potential stopping points 422 may be performed on and/or supervised from the development system 117.

Figure 6:
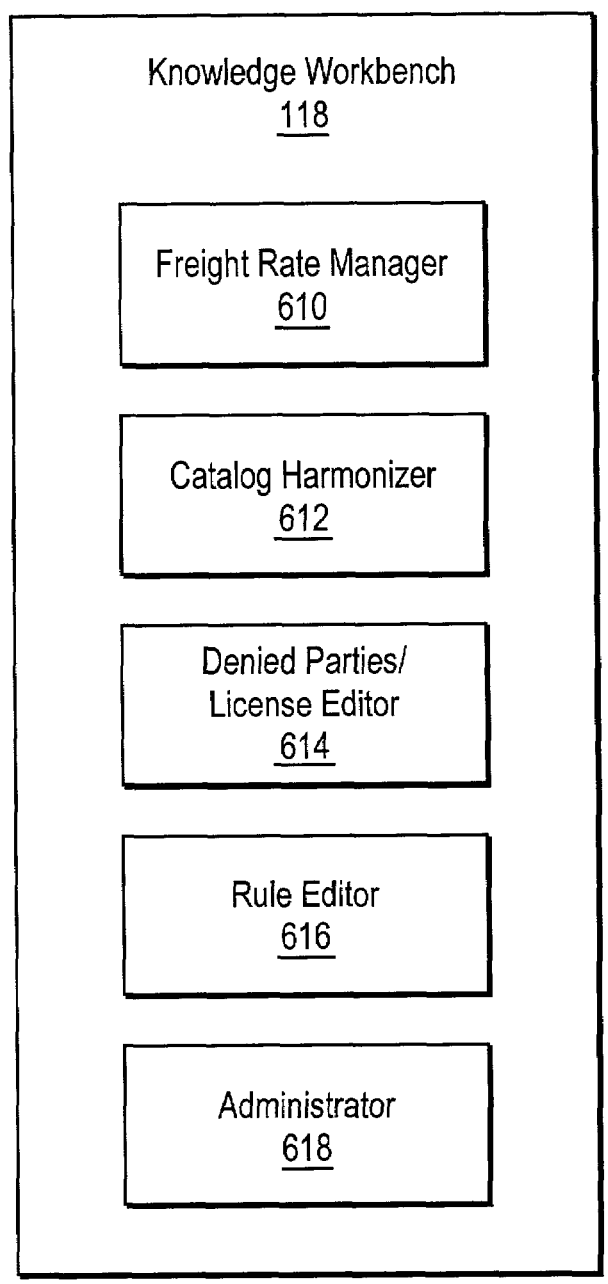
FIG. 6 is a high-level block diagram illustrating modules in the knowledge workbench according to a preferred embodiment of the system

FIG. 6 is a high-level block diagram illustrating modules in the knowledge workbench 118 according to a preferred embodiment of the system 100. The knowledge workbench 118 is preferably a unified, centralized application module that a customer uses to view, add, modify, and/or delete content in the central knowledge base 110. Alternatively, the knowledge workbench 118 may be a distributed set of individual modules. The knowledge workbench 118 is preferably executed on a conventional computer system. This computer system may be the same system on which the client 128 or other entities within the system 100 execute.

Figure 7:
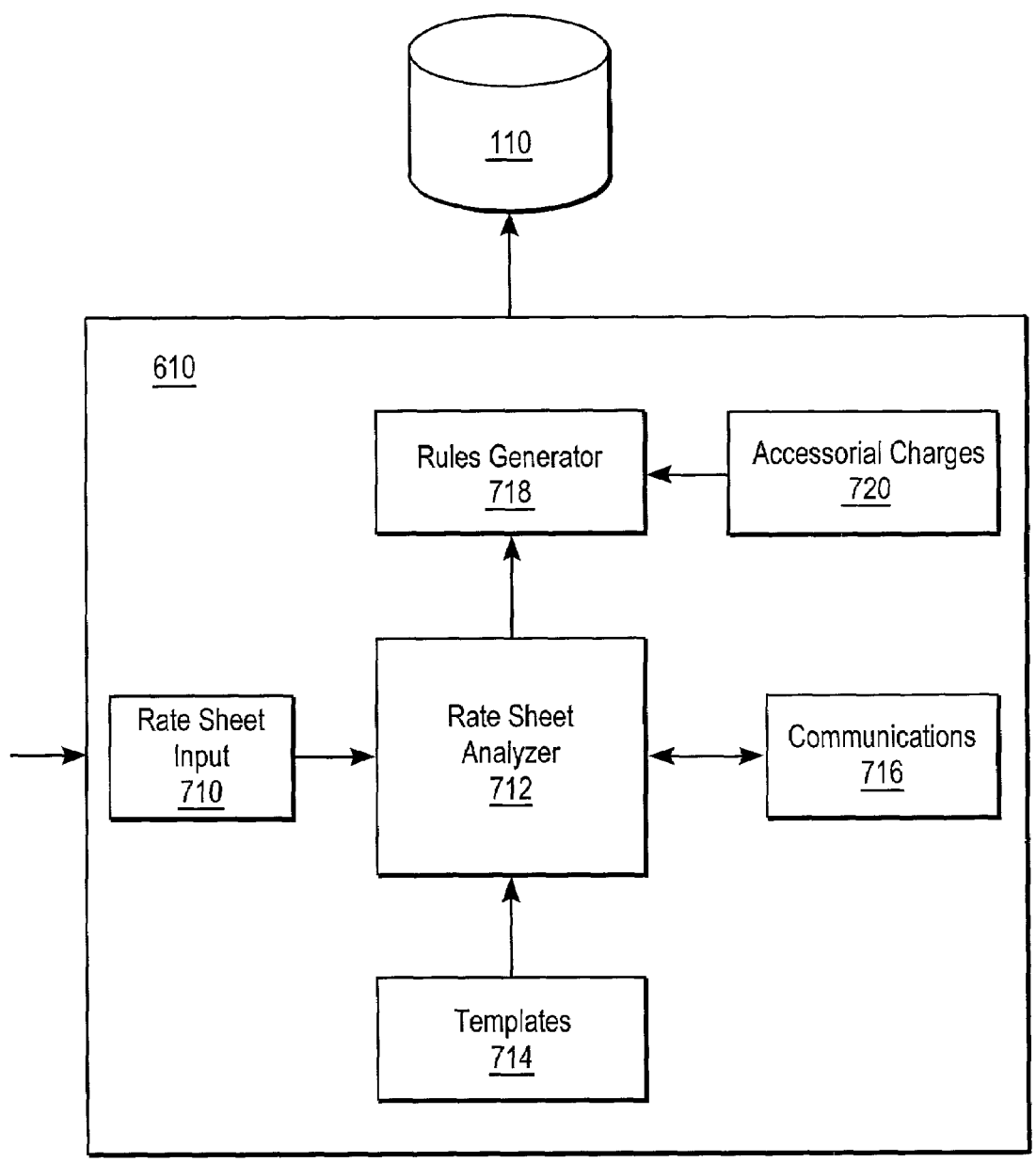
FIG. 7 is a block diagram illustrating a more detailed view of the freight rate manager module in the knowledge workbench according to an embodiment of the present invention.

The knowledge workbench 118 preferably includes a freight rate manager 610 for enabling a customer to enter data describing negotiated shipping rates into the freight rates module 316. FIG. 7 is a block diagram illustrating a more detailed view of the freight rate manager 610 according to an embodiment of the present invention. The freight rate manager 610 contains a rate sheet input module 710 for receiving data representative of a rate sheet. A rate sheet is a document enabling the determination of the cost of shipping goods from an origin to a destination. Preferably, the rate sheet input module 710 accepts the rate sheet in the MICROSOFT® EXCEL® spreadsheet format. Since this is a popular format, many major shipping companies make rate sheets available as Excel spreadsheets. In addition, scanning software can turn printed rate sheets into Excel spreadsheets through an optical character recognition (OCR) process, and electronic rate sheets in other formats can be converted into the Excel format. Of course, alternative embodiments of the rate sheet input module 710 accept rate sheet data in other formats.

Table 1 is part of an exemplary rate sheet:

TABLE 1

| WEIGHT (LBS.) | Second Day Service Rate Scales | | | |
|---|---|---|---|---|
| | A | B | C | D |
| Minimum | $55.00 | $55.00 | $65.00 | $65.00 |
| 100 | .40 | .53 | .58 | .65 |
| 500 | .38 | .48 | .56 | .63 |
| 1,000 | .35 | .46 | .54 | .60 |
| 2,000 | .33 | .44 | .52 | .58 |

The caption of Table 1 identifies that these rates are applicable for second day service. The left-hand column specifies the total weight of the goods. The second row ("A . . . B . . . C . . . D") identifies four separate rate scales.

Table 1 is zone-based and is interpreted using a second sheet that assigns geographic areas to zones. For example, the second sheet may contain a map of the United States and identify certain states as being within certain zones. The second sheet typically also contains a matrix mapping the zones to the rate scales, such as the matrix of Table 2.

TABLE 2

| From Zone | To Zone | | | |
|---|---|---|---|---|
| | 1 | 2 | 3 | 4 |
| 1 | A | B | D | C |
| 2 | B | A | C | B |
| 3 | C | B | A | B |
| 4 | D | C | B | A |

The shipping rate is calculated by identifying the zones corresponding to the origin and destination of the goods, selecting the appropriate rate scale for shipments between the zones with Table 2, and using Table 1 to calculate the shipping rate for the given weight of goods and rate scale.

Different types of rate sheets specify rates in different manners. For example, other zone-based rate sheets may identify zones by ZIP code or by assigning each state or country to a separate zone. Other rate sheets specify, for example, point-to-point rates, volume-based rates, freight-based (i.e., weight-based) rates, or hybrid rates. Those of skill in the art will recognize that the freight rate manager 610 can also support other types of rate sheets.

Preferably, the rate sheet input module 710 allows the user to provide additional information about the rate sheet. Preferably, the rate sheet input module 710 provides the user with a "wizard" with which the user can input the additional information. A wizard provides the user with a graphical user interface (GUI) having menu choices, text boxes, etc., that the user can select or fill out to indicate certain information. In one embodiment, market research and historical data are analyzed to identify information commonly requested from users. The wizard allows a user to input this information by, for example, providing the user with a check box and/or data entry fields with which the user can indicate the information.

In one embodiment, the module 710 prompts the user to input the type of rate sheet. If the user indicates that the rate sheet is zone-based, the module 710 prompts the user to identify the geographic regions in each zone. The module 710 may accomplish this task, for example, by presenting the user with a map of the world or certain countries and a "Zones" list box and asking the user to identify the countries in each zone. The user may also indicate the currency utilized in the rate sheet and/or whether the weights and measures in the rate sheet are in English or metric units. In one embodiment of the present invention, all or some of the information is determined automatically by the freight rate manager 610 instead of through a wizard or other user interaction.

The rate sheet data received by the rate sheet input module 710 are provided to a rate sheet analyzer module 712 (hereinafter referred to as the "rate sheet analyzer" or simply "the analyzer"). The analyzer 712 applies heuristics and templates to the rate sheet data in order to interpret the rates and other information contained therein. The output of the analyzer 712 is provided to a rule generator 718.

In one embodiment, the heuristics applied by the analyzer 712 identify keywords in certain cells of the rate sheet that signify the types of data. Such keywords may include "overnight," "minimum," "Colombia," "door-to-door," "zones," "weight," etc. Different keywords may have different meanings or weights depending upon the keywords' locations in the rate sheet. For example, keywords along the top or left side of the rate sheet typically define headings. Likewise, blocks of numbers in the middle of the sheet are probably shipping costs, weight data, etc.

Preferably, the heuristics include logic for identifying OCR errors. For example, if a particular shipping rate within the rate sheet is far outside an expected value, the heuristics flag the shipping rate as a possible error. In one embodiment, the freight rate manager 610 provides a dialog box or other interface to the user to allow the user to view, and possibly alter, the suspect data.

The rate sheet analyzer 712 preferably makes use of one or more rate sheet templates stored in a rate sheet template storage module 714 to interpret the rate sheet data. In one embodiment, the template storage module 714 is local to the freight rate manager 610. In another embodiment, the template storage module 714 is remote from the freight rate manager 610 and may be stored in the central knowledge base 110 or on a server accessible via the Internet or another network. The templates are preferably generated by analyzing typical rate sheets and identifying standard formats. In one embodiment, specialized templates are generated for the rate sheets of major shipping companies.

The heuristics within the analyzer 712 preferably use the identified keywords or other information to find a template that fits the rate sheet data. The analyzer 712 then interprets the rate sheet data as specified by the template. For example, assume that the analyzer 712 isolates the keyword "UPS" from the rate sheet data. Also assume that the template storage 714 contains a specialized template for interpreting UPS rate sheets. The analyzer 712 is likely to select the UPS template (unless other rate sheet data do not match the template) and use it to interpret the remainder of the data in the rate sheet.

In another example, assume that the heuristics identify the word "weight" on the left side of the spreadsheet defined by the rate data and the word "zones" across the top. Also assume that the template storage 714 contains a template containing rules for interpreting rate sheets having "weight" and "zones" in the aforementioned locations. If the analyzer 712 determines that the template matches the rate data, the analyzer uses the rules in the template to interpret the rate data.

In a preferred embodiment, if the rate sheet analyzer 712 cannot match a template to the rate data, the analyzer passes the rate data to a communications module 716. In one embodiment, the communications module 716 passes the rate sheet data to another location where developers can analyze the data. Preferably, the communications module 716 is coupled to a communications link, such as link 114, with which it can send data to, and receive data from, a remote computer via the Internet. The analyzer 712 preferably passes the rate sheet data to the communications module 716. The communications module 716, in turn, passes the data to a remote server where developers analyze the rate sheet data and, preferably, generate a new template or modify an existing template to process the rate sheet data. Then, the developers pass the new or modified template and the rate sheet data back to the analyzer 712 via the communications module 716. The analyzer 712 stores the template in the template storage 714 and applies the template to the formerly-unknown rate sheet data.

In an alternative embodiment, the communications module 716 stores the rate data locally. This alternative may be desirable, for example, when the shipper or user considers the rate data proprietary and does not allow it to be sent offsite for analysis. Accordingly, a developer can visit the physical location of the freight rate manager 610 and review the rate data.

The freight rate manager 610 also preferably includes an accessorial charge module 720 for adding accessorial charges. Accessorial charges are exceptions, or special fees, that need to be considered in addition to the rates specified by the rate sheet. For example, accessorial charges may be added if a forklift is required, more than two people are required to move the goods, the goods require refrigeration or other special care, or the delivery address is a school or hospital. In one embodiment, the accessorial charge module 720 allows the user to select from a menu of possible accessorial charges. Preferably, the menu items are determined by analyzing typical rate sheets and shipping needs to identify common accessorial charges. In addition, the module 720 preferably has a facility allowing the user to modify the preset accessorial charges and/or add new accessorial charges. The accessorial charge module 720 preferably communicates the accessorial charges to the rule generator 718.

The rules generator 718 preferably generates Prolog code describing the rate sheet and accessorial charge data respectively received from the rate sheet analyzer 712 and the accessorial charge module 720. When this code is given inputs and executed, it generates a shipping cost according to the terms of the rate sheet and any accessorial charges. Preferably, the rules generator stores the Prolog code in the freight rates module 316 in the central knowledge base 110.

Figure 8:
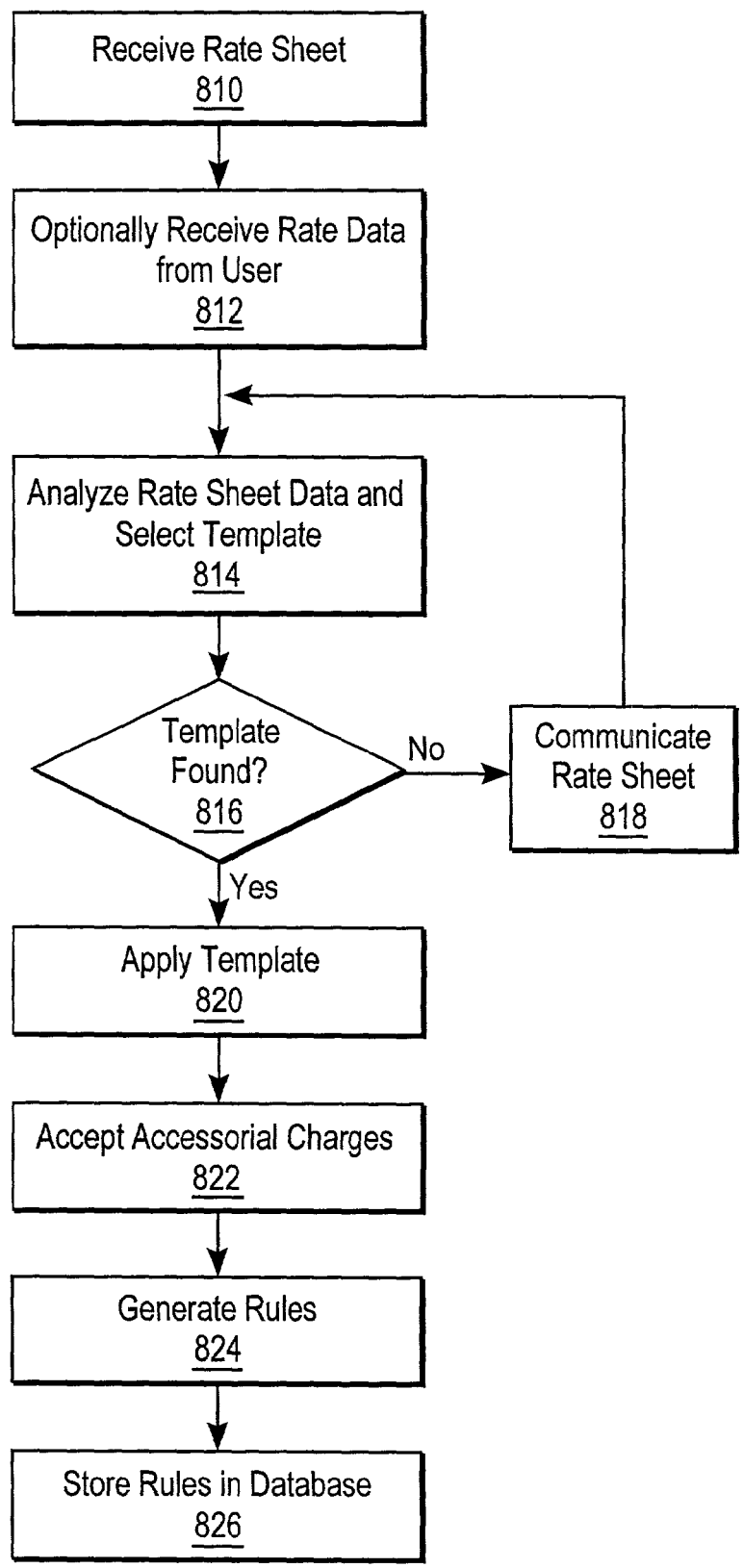
FIG. 8 is a flowchart illustrating the operation of the freight rate manager of FIG. 6 according to an embodiment of the present invention.

FIG. 8 is a flowchart illustrating the operation of the freight rate manager 610 of FIG. 6 according to an embodiment of the present invention. At step 810, the manager 610 receives a rate sheet as an Excel spreadsheet or another format. The manager 610 optionally receives 812 other information about the rate sheet from the user, such as information about the type of rate sheet or the geographic areas in particular zones.

The freight rate manager 610 analyzes 814 the rate sheet data using heuristics and then attempts to select a template that matches the rate sheet. If 816 the manager 610 cannot find a matching template, it preferably stores 818 the rate sheet data (either locally or remotely) and flags it for further review by a developer. If 816 the manager 610 finds a matching template, it preferably applies 820 the template to the rate sheet data.

The freight rate manager 610 also accepts 822 information about accessorial charges from the user or another source. Then, the manager 610 generates 824 rules embodying the rate sheet data and accessorial charges. In one embodiment, these rules take the form of Prolog code. The freight rate manager 610 preferably stores 826 the rules in the freight rates module 316 in the central knowledge base 110.

Figure 9:
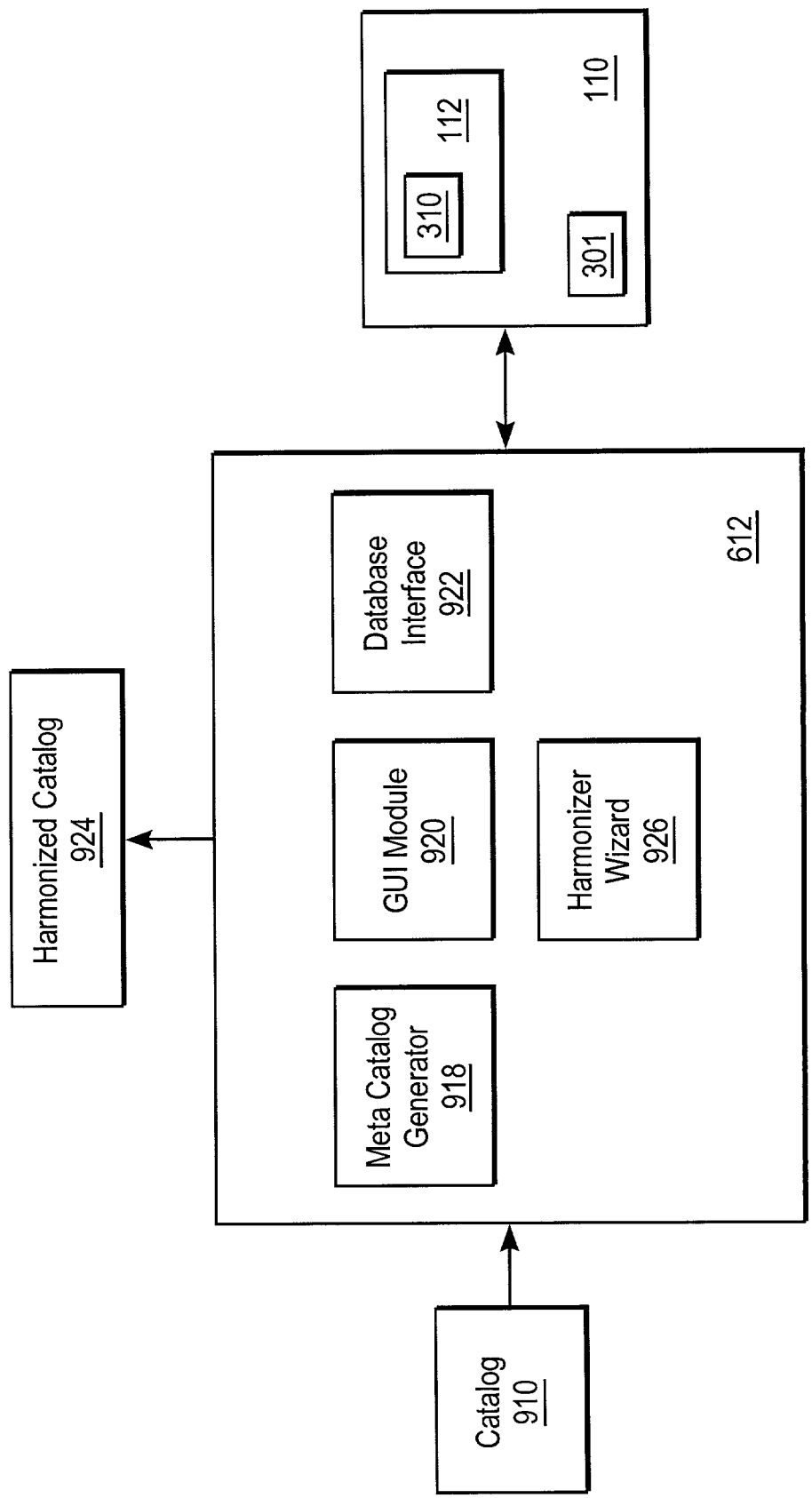
FIG. 9 is a block diagram illustrating a more detailed view of the catalog harmonizer and the central knowledge base.

Returning to FIG. 6, the knowledge workbench 118 also preferably includes a catalog harmonization module (also referred to as a "catalog harmonizer") 612. In general, a user uses this module 612 to harmonize the customer's catalog of goods according to one or more countries' HSs. FIG. 9 is a block diagram illustrating a more detailed view of the catalog harmonizer 612 and the central knowledge base 110.

The catalog 910 is preferably an electronic list of at least a subset of the goods shipped by the customer. The catalog 910 may contain information describing the goods, such as the weights and dimensions of the goods. The catalog 910 may also be hierarchical, so that goods are classified by class and subclass, unorganized, or some state in-between.

The catalog harmonization module 612 receives the catalog 910 as an input. If necessary, a meta-catalog generation module (hereinafter the "meta-catalog generator" or "generator") 918 within the catalog harmonizer 612 receives the catalog 910. The generator 918 preferably generates a hierarchical meta-catalog from non-hierarchical catalog data. Thus, the generator 918 is preferably utilized if the catalog data is not hierarchical. In one embodiment of the present invention, the generator 918 utilizes a GUI with which the user can identify and hierarchically order the goods in the catalog 910. In one embodiment, heuristics within the generator 918 assist the user by identifying and classifying similar goods in similar categories. For example, the GUI may allow the user to specify that all goods having a description containing the term "sweaters" are classified as a subclass of the "clothing" class. In this description, the term "catalog" refers to either a hierarchical catalog received as input or a hierarchical meta-catalog created by the meta-catalog generator 918 from at least partially non-hierarchical data.

A GUI module 920 provides the GUI for the generator 918, the GUI for the catalog harmonizer 612, and the GUI for a harmonizer wizard module 926 utilized by the harmonizer. A user uses these latter two GUIs to harmonize the goods in the catalog 910 with one or more countries' HSs. To support harmonization of the goods in the catalog, a database interface module 922 in the catalog harmonization module interacts with the classification module 301 and the HS module 310 in the central knowledge base 110 in order to determine suggested classifications in one or more countries' HSs for the goods in the catalog 910. In one embodiment, the database interface 922 receives information describing the good or goods to be harmonized and the country or countries in which to harmonize the good from the GUI module 920. The information about the good may include its name, SKU, description, price, position in the catalog hierarchy, and/or any other information known about the good. Preferably, the database interface 922 performs any formatting of the information, if necessary, and passes the information to the classification module 301 in the central knowledge base 110.

The classification module 301 preferably utilizes the HS module 310 to find the most likely matching classifications in the selected country or countries for the identified good or goods. In one embodiment, the output of the classification module 301 is a ranking of the one or more classifications in one or more countries in which the good is likely to fall. Since any given classification (i.e., node in the unified HS tree 410) may be associated with one or more other classifications through merged nodes or cross-references, each classification returned by the classification module 301 may pertain to multiple countries.

Oftentimes, the classification module 301 will return classifications having fewer than the full number of digits of precision, i.e., the returned classifications are not leaf nodes in the unified HS tree 410. In some situations, the classification module 301 cannot classify the good to the precision required at the leaf node.

In other situations, it is unnecessary or undesirable for the classification module 301 to classify a good at the maximum precision. There are situations when it is desirable to stop classifying the good after a certain level of precision. For example, if every classification beneath a certain level of a branch of the unified HS tree 410 has the same entry rates (duties, taxes, fees, etc), then all classifications below that point can be treated as the same for landed cost purposes and there is no reason to classify the good any further because it will not affect the landed cost estimate. Because the stop location may have only six (or even four) digits of precision, and the leaf nodes of the unified HS tree 410 may have 20 or more digits, it is inefficient and costly to classify the good at greater than the necessary levels of precision.

Accordingly, a preferred embodiment of the harmonizer 612 interfaces with the module 422 in the unified HS tree 410 holding the potential stopping points and selectively indicates when a reached node is a potential stopping point. Preferably, the user can use an interface provided by the GUI module 920 to selectively indicate whether to use the potential stopping point as the classification or to continue classifying the good at a greater level of precision.

In one embodiment of the present invention, the classification module 301 selects keywords from the received description of the good and then searches for the keywords in the HS classification descriptions. If no description is available, the classification module 301 preferably searches on keywords generated from the other received information about the good.

Alternative embodiments of the classification module 301 perform more sophisticated searching. For example, one embodiment uses a stored thesaurus (not shown) to generate search keywords related to the words in the description. Another embodiment assigns weight values to the search terms and gives more weight to those terms that are likely to produce valid results. Yet another embodiment of the classification module 301 uses statistical modeling to analyze feedback from the user and assign more frequently-selected classifications a greater weight in subsequent search results.

Moreover, one embodiment of the classification module 301 includes logic for automatically improving its classifications over time by adding new words and associations to the HS tree 410 in response to users' harmonizations. Thus, the classification module 301 remembers harmonizations selected by users, and uses these harmonizations to improve the classifications selected in response to future harmonization of the same, or similar, goods. This feature can preferably be selectively disabled in order to avoid mis-training the classification module 301.

In one embodiment, the classification module 301 can be overridden by user-specified classification rules stored in the custom content 322 module in the database 112. In one embodiment, the classification module 301 (or another module in the system) provides the user with a graphical wizard that allows the user to specify rules for determining classifications. In one embodiment, the classification module 301 allows the user to specify rules such as "If SKU is 'x,' then use classification 'y'" or "If the good's description contains 'PDA,' then use classification 'z.'" These classifications are returned by the classification module 301.

The output of the classification module 301 is preferably passed back to the database interface 922. The database interface 922 preferably reformats the classifications, if necessary, and passes it to the GUI module 920. The user interacts with the GUI module 920 to classify the goods in the catalog 910 according to the HS classifications returned by the classification module 301. The end-result is the harmonized catalog 924. The user preferably uses the knowledge workbench 118 to store the harmonized catalog 924 in the custom content module 322 in the database 112 of the central knowledge base 110.

In a preferred embodiment, the catalog harmonizer 612, in addition to classifying a good with an HS code, returns an HS identification (HS ID) to the user. An HS ID is a unique ID associated with the node (i.e., HS code) in the unified HS tree and represents the HS code at a particular point in time. Preferably, the system 100 stores HS IDs in the HS module 310 in the database 112. In one embodiment, if a change occurs to the unified HS tree that affects the HS code, the system 100 indicates to the user that the HS code identified by the HS ID has changed. In another embodiment, the user occasionally provides the HS IDs to the system 100 to determine whether the HS codes have changed.

When a country makes a change to an HS code, user action may be required. For example, a country may eliminate an HS code or change a leaf node into a parent by giving it two or more new descendents. In the first case, an eliminated HS code, the HS code identified by the HS ID becomes invalid and the user preferably re-harmonizes the good. In the second case, new child nodes, the HS code and its associated HS ID remain valid, but the user preferably re-harmonizes the good in one of the new child nodes. Other situations where an HS code change may require user action include when a country changes the numbering associated with a code, changes a code so that it is no longer a potential stopping point, and/or changes the description associated with a code. The system 100 preferably retains all custom content and learning associated with changed nodes.

If the unified HS tree is modified in a way that changes a node but does not invalidate the node's associated HS ID, such as when the node is merged with another node, the system 100 preferably redirects the HS ID to the new or changed node. In one embodiment, the system maintains an HS ID redirection table (not shown) in the database 112. This table points the old HS ID to the new or changed node. In this manner, the HS tree can be modified without invalidating HS IDs.

Figure 10:
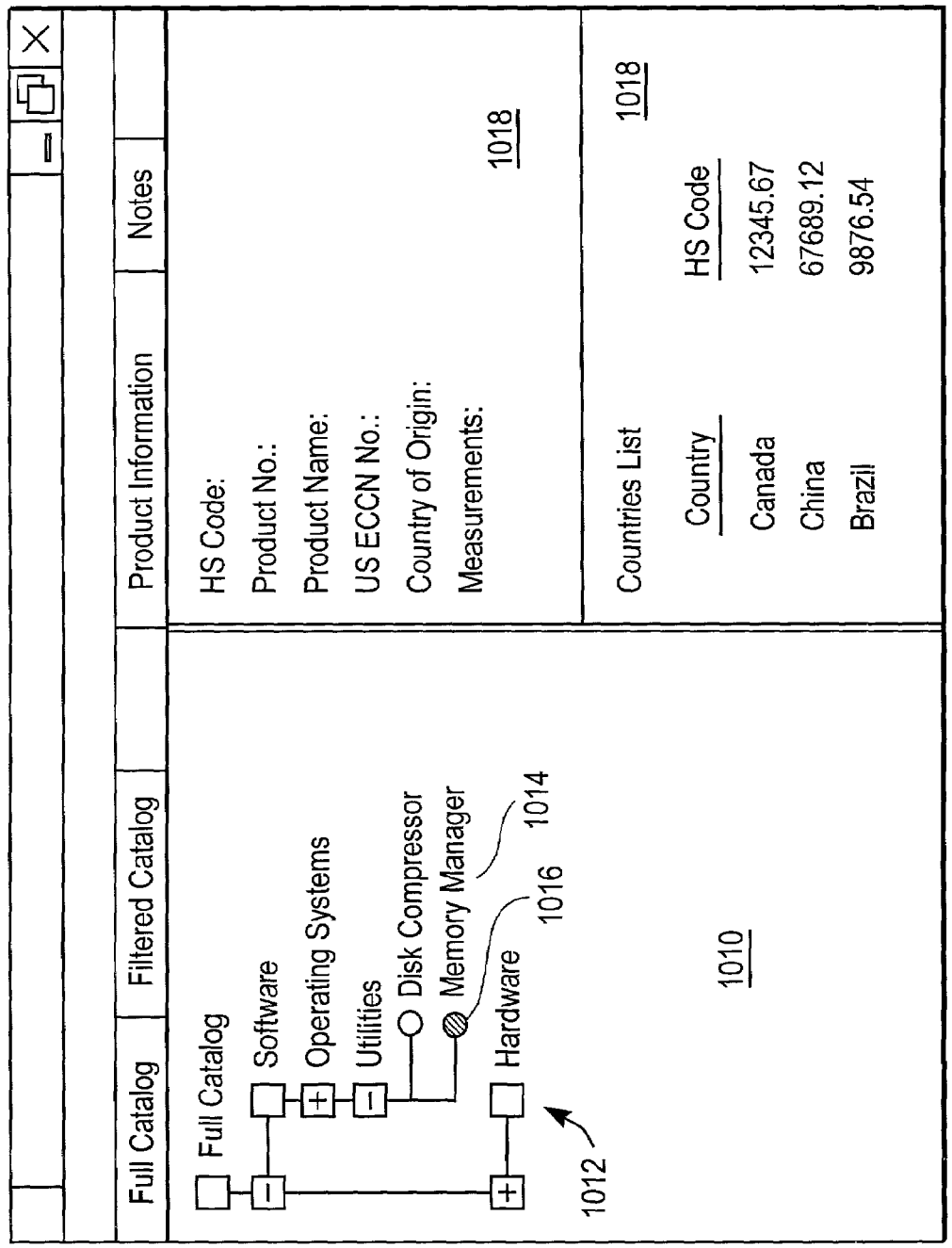
FIG. 10 is an illustration of an embodiment of the graphical user interface (GUI) for the catalog harmonizer produced by the GUI module in the catalog harmonizer for classifying goods in the catalog according to the HSs of one or more countries.

FIG. 10 is an illustration of an embodiment of the GUI 1000 for the catalog harmonizer 612 produced by the GUI module 920 for classifying goods in the catalog 910 according to the HSs of one or more countries. Those of skill in the art will recognize that many variations of the GUI 1000 are possible. The GUI 1000 of FIG. 10 is divided into two main areas. The left side of the GUI 1000 is the catalog views area 1010. This area 1010 preferably displays a graphical representation 1012 of the catalog according to the selected view. In one embodiment, the views include a hierarchical tree view showing the catalog as a hierarchy of goods, a marketing view showing how the goods in the catalog are configured for marketing and selling the goods, a manufacturing view showing how the goods are assembled on the manufacturing floor, an engineering view showing how the goods are designed, and a sets view showing how the goods are declared to customs (also known as a "kits" or "bills-of-materials" view). The sets view is preferably utilized for duty optimization (also referred to as "duty engineering") purposes.

In FIG. 10, the catalog is being viewed as a hierarchical tree, where each node of the tree represents a particular class or subclass of goods. Preferably, nodes can be expanded to display a list 1014 of goods classified in the catalog hierarchy at the nodes. Preferably, the GUI 1000 provides a graphical icon 1016 indicating whether a particular good has been classified. In one embodiment, the icon 1016 is colored to indicate the status of the good. In alternative embodiments, different techniques can be used to indicate whether a good has been harmonized, such as changing the color of the text for the good, changing the shape of the icon 1016, etc. Preferably, the user uses normal navigation techniques, such as arrow keys, mouse clicks, etc. to navigate through the catalog hierarchy 1012, select particular nodes in the tree, and/or select one or more goods listed 1014 at a node.

The right side of the GUI 1000 is preferably the information area 1018. This area 1018 displays fields containing information about the specific good, goods, or nodes selected in the catalog hierarchy area 1010. The fields are preferably editable, so that the user can update the information. This information is preferably contained in the catalog itself, although it can also be stored separately. In one embodiment, the displayed information includes the good's number (e.g., SKU number), name, description, duty units, preferences, United States Export Control Classification Number (ECCN), if applicable, and country of origin.

The displayed information preferably also includes information necessary or useful for calculating the shipping cost for the good, such as the dimensions of the good with or without packaging, the weight of the good, the quantity of the good included in one unit, whether the good is stackable, etc. Alternative embodiments of the GUI 1000 can list additional or different information about the good.

Preferably, the catalog harmonizer 612 includes interfaces and controls (not specifically shown in FIG. 10) that allow the user to simultaneously assign the same HS code to multiple goods. For example, if the user knows that all goods at a certain node in the hierarchical catalog 1012 should be assigned the same HS code, the user uses the interfaces and controls to select the node and assign it the code. All of the goods at the node will inherit the HS code. In the same manner, the user can preferably assign an HS code to a parent node and the catalog harmonizer 612 will automatically cause all goods belonging to nodes descending from that parent node to inherit the HS code.

The information displayed by the GUI 1000 also preferably includes the countries for which a particular catalog category or good should be harmonized. The user selects these countries, and then preferably invokes the harmonizer wizard 926 (which preferably appears in a separate window) to harmonize the selected good or goods in the selected countries.

Launching the harmonizer wizard 926 preferably causes the database interface 922 to interact with the classification module 301 and the HS module 310 in the central knowledge base 110 and return one or more suggested HS classifications for the selected good in at least one of the selected countries. The harmonizer wizard 926 presents the user with an "initial results" page (not shown) containing the suggested HS classifications and the user selects from among them. Then, the user uses the harmonizer wizard 926 to harmonize the good in the country or countries. Once the harmonization is finished, the harmonizer wizard 926 preferably closes its window, and the countries and their HS codes for the selected category or good are listed in the information area 1018.

In an alternative embodiment of the system 100, the harmonizer portion of the catalog harmonizer 612 executes as a standalone application. In this embodiment, the harmonizer portion presents the user with an initial page with which the user provides a description of a good and selects the country or countries in which to harmonize the good. Then, the user invokes the harmonizer wizard 926. After the harmonizer wizard 926 executes, the user is provided with a page showing the good and the associated HS codes.

FIG. 13 is an illustration of an embodiment of the GUI 1300 for the harmonizer wizard 926 according to an embodiment of the system 100. Those of skill in the art will recognize that many variations of the GUI 1300 are possible. The user preferably uses the harmonizer wizard GUI 1300 to harmonize goods in the catalog according to one or more countries' HSs. In one embodiment, the GUI 1300 includes a countries area 1310 that lists the countries in which the good will be harmonized by the wizard 926. Preferably, one of the countries is highlighted to indicate that it is selected.

The GUI 1300 also preferably includes a tree area 1312 that displays a representation of the nodes in the selected country's HS tree. The tree area 1312 may indicate, through highlighting or some other means, that a particular node is selected.

The GUI 1300 also preferably includes a text area 1314 that includes a description of the currently-selected node in the HS tree, along with available child nodes. For example, if the selected node corresponds to HS code "8524.99.10," and the current country is Canada, the description may read: "Magnetic disks of an educational, scientific, or cultural character . . . " The GUI 1300 also preferably displays controls 1316 with which the user can navigate the nodes of the tree 1312.

The user preferably utilizes the GUI 1300 to pick the HS classification that best fits the good or goods being harmonized. This classification may be associated with one or more countries because the node may be merged and/or cross-referenced. These one or more countries may be the same as the set of countries selected by the user, or different but having at least one country in common. The harmonizer wizard 926 may ask the user to answer refining questions and navigate through the unified HS tree 310 hierarchy, starting at the picked classification, until the harmonization code (typically a leaf node or stopping point) for the good is determined for one country. Since the leaf node may be merged, the harmonization code may apply to multiple countries.

If there are remaining countries for which the good must be harmonized, the wizard 926 preferably analyzes the cross-references from the harmonized nodes to find nodes associated with the HS trees of the remaining countries. The wizard preferably follows the cross-reference that points to the node associated with the most remaining countries. At this point, the user uses the wizard 926 and controls 1316 to answer refining questions and navigate past the cross-referenced node until the harmonization code is determined. If there is no cross reference, the wizard 926 preferably searches up the HS tree hierarchy of the selected node until a node in common with (i.e., merged or cross-referenced) a node from one of the remaining countries is identified.

Returning to FIG. 6, the knowledge workbench 118 also preferably includes a denied parties/licenses editor module 614. A user uses this module 614 to enter custom denied parties, custom license requirements, and/or exceptions to the denied parties and license requirements information held in the compliance module 314 in the database 112. Preferably, the custom information is held in the custom content module 322 in the database 112.

The rules editor module 616 in the knowledge workbench 118 preferably allows the user to create custom rules that affect the operation of the system 100. For example, the user can create rules that say "pad all quotes by 1.5%," "ignore quota restrictions for goods X, Y, and Z being shipped to Mexico," "add two inches to specified dimensions to allow for packaging," "add two days to all estimated shipping times" etc. In one embodiment, these rules are compiled by the rule compilation module 302 in the central knowledge base 110 and stored in the custom content module 322 in the database 112.

The administrator module 618 in the knowledge workbench 118 preferably allows certain users to start, stop, and restart the various modules provided on the local/remote server 110 and/or knowledge workbench 118. The administrator module 618 also preferably allows certain users to add, modify, and delete other users and their permissions. For example, not all users may be allowed to enter custom rules or denied parties or harmonize goods.

Preferably, the denied parties/licenses editor 614, rules editor 616, and administrator 618 modules are implemented as wizards. Alternative embodiments of the knowledge workbench 118 may contain greater, fewer, or different modules than those described herein as may be necessary to support the functionality of the system.

Returning to FIG. 1, the applications server 124 is preferably a conventional computer system holding additional application modules for execution on the system 100. The application modules on the applications server 124 preferably access the content in the central knowledge base 110 through the API 126. Accordingly, the functionality of the system 100 can be expanded through the application modules.

Figure 11:
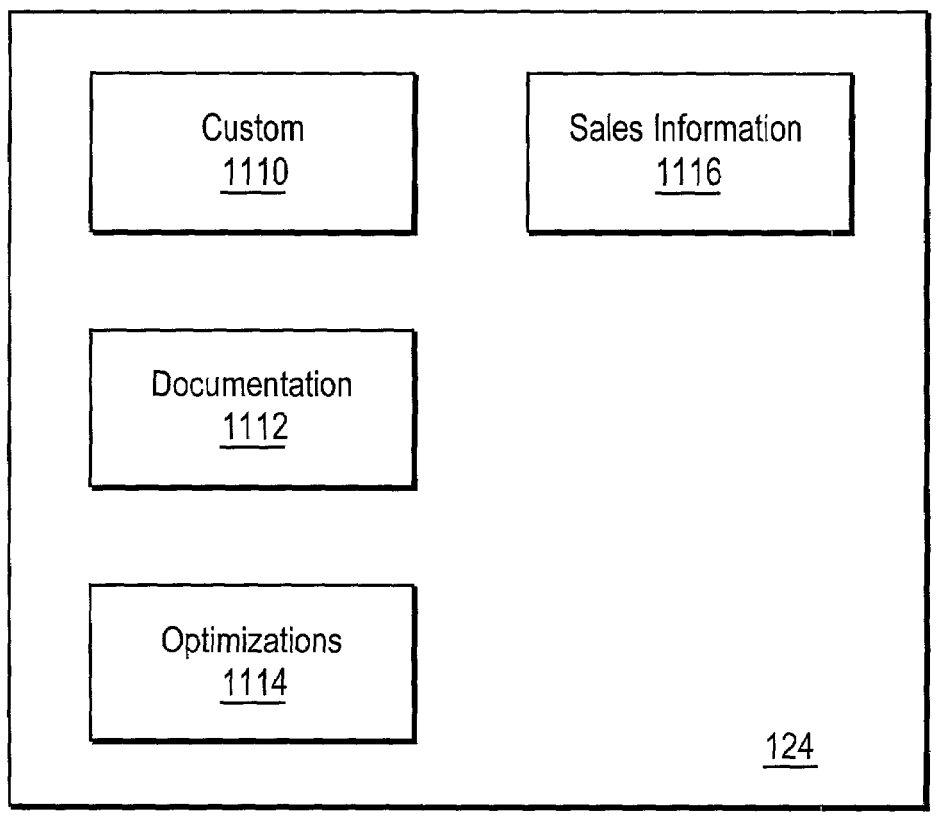
FIG. 11 is a high-level block diagram illustrating the application modules in the applications server according to one embodiment of the system.

FIG. 11 is a high-level block diagram illustrating the application modules in the applications server 124 according to one embodiment of the system 100. Of course, alternative embodiments may have more, fewer, or different application modules than those illustrated in FIG. 11. A custom applications module 1110 preferably stores custom application modules developed by the customer or another entity. This module 1110 illustrates that the customer is free to extend the functionality of the system 100 by developing custom modules.

A documentation module 1112 preferably supplies information about documents that may be required or desired when shipping goods among the destinations supported by the system. This module 1112 preferably utilizes the content in the central knowledge base 110 to determine any needed information about the goods and shipment and then uses this information to identify and generate necessary documents. In one embodiment, the functionality of the documentation module 1112 is provided by the TRADEPAQ product available from TRADEPAQ Corporation of New York City, N.Y.

An optimizations module 1114 preferably performs duty engineering functions, such as identifying optimal manufacturing and warehousing locations, based on the information in the central knowledge base 110. For example, in one embodiment the optimizations module 1114 generates a matrix of destinations, warehouse locations, and unit landed costs and uses this matrix as an input into an optimization system in order to identify the optimal warehouse locations with respect to shipping costs, tariffs, and/or other variables. Other embodiments may analyze the information in the system 100 to perform other types of optimizations. One embodiment of the optimization module 1114 utilizes an optimization system from i2 Technologies, Inc. of Dallas, Tex.

A sales information module 1116 preferably integrates customer and sales information directly into the system. In one embodiment, the sales information module includes the Siebel Sales application available from Siebel Systems, Inc. of San Mateo, Calif.

In sum, the present invention allows a user to quickly and accurately determine answers to questions related to domestic and international shipping of goods. The system 100 utilizes the content in the central knowledge base 110 to determine a landed cost for goods, whether the shipment will be denied, when the goods will arrive, what documents will be needed to support the shipment, and where the goods should be warehoused to maximize efficiencies.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A system for processing data associated with a freight shipment, comprising:
one or more computer processors configured to:
execute a rate sheet input module capable of accepting a plurality of rate sheets wherein each rate sheet specifies published freight rates and each rate sheet is associated with one of a plurality of freight carriers and is respectively structured according to one of a plurality of formats, the rate sheet input module receiving and storing a rate sheet associated with a specific freight carrier of a plurality of freight carriers and structured according to a specific format of the plurality of formats;
execute a rate sheet analyzer module adapted to interface with a template storage module storing a plurality of templates, wherein a specific template of the plurality of templates is associated with the specific freight carrier and is structured according to the specific format of the plurality of formats to interpret the rate sheet, the rate sheet analyzer module producing an output by:
(a) selecting the specific template of the plurality of templates by matching the specific freight carrier associated with the rate sheet with the specific freight carrier associated with the specific template; and
(b) interpreting the rate sheet by applying the specific template to the rate sheet; and
execute a rule generation module, the rule generation module receiving the output from the rate sheet analyzer module and generating computer code based on the output, wherein when the code is executed, the code generates a freight charge associated with the freight carrier.

2. The system of claim 1 wherein the rate sheet is in a spreadsheet format.

3. The system of claim 1 wherein the rate sheet specifies zone-based rates.

4. The system of claim 1 wherein the system further comprises a user-interface module adapted to receive input from a user indicating the specific freight carrier associated with the rate sheet.

5. The system of claim 1 wherein the rate sheet analyzer module selects the specific template to interpret the rate sheet based on a keyword in the rate sheet.

6. The system of claim 5 wherein the keyword identifies the freight carrier.

7. The system of claim 5 wherein the selection of the specific template to interpret the rate sheet based on the keyword in the rate sheet is based on the location of the keyword in the rate sheet.

8. The system of claim 1 wherein the template storage module is in a remote location with respect to the rate sheet analyzer module.

9. The system of claim 8 further comprising:
the one or more computer processors configured to execute a communications module for communicating the rate sheet to the remote location, receiving the specific template adapted to interpret the received rate sheet, and providing the specific template to the template storage module.

10. The system of claim 5 further comprising the one or more computer processors configured to execute a tariffs module for calculating a tariff charge, the freight charge comprising the tariff charge.

11. The system of claim 10 further comprising the one or more computer processors configured to execute a compliance module for determining whether a proposed shipment of goods to a destination country complies with import regulations of the destination country.

12. The system of claim 1 further comprising the one or more computer processors configured to execute a logging module wherein the freight charge is stored in a file.

13. The system of claim 1 further comprising the one or more computer processors configured to execute a packaging module wherein the freight charge is determined based in part on a package weight calculation provided by the packaging module.

14. The system of claim 1 further comprising:
the one or more computer processors configured to execute an accessorial charge module for accepting data representative of accessorial charges associated with the freight rates and determining an accessorial charge wherein the freight charge comprises the accessorial charge.

15. A method of determining a charge associated with a freight shipment comprising:
receiving freight data associated with freight to be shipped;
receiving data representative of a rate sheet, the rate sheet specifying published freight rates associated with a freight carrier;
storing the rate sheet;
selecting a template from a template storage module, via one or more computer devices executing a rate sheet analyzer module, by matching a first freight carrier associated with the template with a freight carrier indicated in the rate sheet;
retrieving the template from the template storage module to interpret the rate sheet, the template storage module storing a plurality of templates wherein each template is adapted to respectively interpret a particular rate sheet;
producing output, via the one or more computer devices executing the rate sheet analyzer to interpret the rate sheet by applying the template to the rate sheet;
generating computer code based on the output via the one or more computer devices executing a rule generation module; and
generating a freight charge, via the one or more computer devices, by executing the computer code.

16. The method of claim 15 wherein the rate sheet is in a spreadsheet format.

17. The method of claim 15 wherein the rate sheet specifies zone-based rates.

18. The method of claim 15 further comprising:
receiving input from a user providing identifying information associated with the rate sheet.

19. The method of claim 18 wherein the rate sheet identifying information associated with the rate sheet identifies the freight carrier associated with the rate sheet.

20. The method of claim 16 wherein retrieving the template from the template storage module to interpret the rate sheet is based on a keyword in the rate sheet.

21. The method of claim 20 wherein the keyword identifies the freight carrier.

22. The method of claim 20 wherein retrieving the template from the template storage module to interpret the rate sheet is based on the location of the keyword in the rate sheet.

23. The method of claim 15 wherein the template storage module is in a remote location with respect to the rate sheet analyzer module.

24. The method of claim 23 further comprising the step of:
transmitting the rate sheet to the remote location; and
receiving an identifier associated with the rate sheet used by the rate sheet analyzer module to select the template.

25. The method of claim 15 further comprising:
receiving a second template for interpreting a second rate sheet; and
storing the second template in the template storage module.

26. The method of claim 15 further comprising:
accepting data representative of accessorial charges associated with the freight rates; and
generating the freight charge comprising an accessorial charge, via the one or more computer devices.

27. A computer-readable medium product containing code executable by a computer processor for determining a freight charge comprising computer-readable program instructions adapted for:
accepting a plurality of rate sheets associated with a plurality of carriers wherein each rate sheet specifies published freight rates and each rate sheet is respectively structured according to one of a plurality of formats;
receiving a specific rate sheet associated with a specific freight carrier and structured according to a specific format of the plurality of formats;
storing a plurality of templates wherein a specific template of the plurality of templates is adapted to interpret the specific rate sheet;
selecting the specific template of the plurality of templates to interpret the specific rate sheet by matching a first freight carrier associated with the specific template of the plurality of templates with the specific freight carrier associated with the specific rate sheet;
producing output by interpreting the specific rate sheet based on the specific template;
and
generating computer code based on the output, wherein when the code is executed, the code generates the freight charge associated with the freight carrier.

28. The computer-readable medium product of claim 27 wherein the specific rate sheet is in a spreadsheet format.

29. The computer-readable medium product of claim 27 wherein the specific rate sheet specifying zone-based rates.

30. The computer-readable medium product of claim 27 wherein the computer-readable program instructions are adapted for receiving input from a user to specify information about the specific rate sheet.

31. The computer-readable medium product of claim 28 where the computer-readable program instructions are adapted for selecting the template to interpret the specific rate sheet based on a keyword in the rate sheet.

32. The computer-readable medium product of claim 31 where the keyword identifies the freight carrier.

33. The computer-readable medium product of claim 28 where the selection of the specific template to interpret the specific rate sheet based on the keyword in the rate sheet is based on the location of the keyword in the rate sheet.

34. The computer-readable medium product module of claim 27 wherein the computer-readable program instructions are adapted for:
communicating the specific rate sheet to a remote system for analysis; and
receiving an indication from the remote system identifying the specific template to interpret the specific rate sheet.

35. The computer-readable medium product of claim 27 wherein the computer-readable program instructions are adapted for receiving the plurality of templates.

36. The computer-readable medium product of claim 27 wherein the computer-readable program instructions are adapted for accepting data representative of accessorial charges associated with the freight rates for generating an accessorial charge.

37. The computer-readable medium product of claim 36 wherein the computer-readable program instructions are adapted for calculating the freight charge comprising the accessorial charge.

* * * * *